United States Patent [19]
Ngo et al.

[11] Patent Number: 5,933,150
[45] Date of Patent: Aug. 3, 1999

[54] SYSTEM FOR IMAGE MANIPULATION AND ANIMATION USING EMBEDDED CONSTRAINT GRAPHICS

[75] Inventors: J. Thomas Ngo, Sunnyvale; Bruce Randall Donald, Palo Alto, both of Calif.

[73] Assignee: Interval Research Corporation, Palo Alto, Calif.

[21] Appl. No.: 08/693,028

[22] Filed: Aug. 6, 1996

[51] Int. Cl.[6] .................................................. G06F 15/00
[52] U.S. Cl. ............................................................. 345/473
[58] Field of Search .................................. 345/473, 474, 345/475, 440, 441

[56] References Cited

U.S. PATENT DOCUMENTS

| | | | |
|---|---|---|---|
| 5,261,041 | 11/1993 | Susman | 395/152 |
| 5,390,294 | 2/1995 | Takeuchi | 395/155 |
| 5,416,899 | 5/1995 | Poggio et al. | 395/155 |

FOREIGN PATENT DOCUMENTS

0520099 A1  12/1992  European Pat. Off. .

OTHER PUBLICATIONS

Auslander, Joel et al, "Further Experience with Controller–Based Automatic Motion Synthesis for Articulated Figures", ACM Transactions on Graphics, vol. 14, No. 4, Oct. 1995, pp. 311–336.

Granieri, John P. et al, "Production and Playback of Human Figure Motion for Visual Simulation", ACM Transactions on Modeling and Computer Simulation, vol. 5, No. 3, Jul. 1995, pp. 222–241.

Librande, Steve, "*Example–Based Character Drawing*", pp. 1–69, 1987.

*Primary Examiner*—Phu K. Nguyen
*Attorney, Agent, or Firm*—Burns, Doane, Swecker & Mathis, L.L.P.

[57] ABSTRACT

A constraint-based graphics system employs different examples of an image to define the constraints of the system. The examples are grouped into subsets which can be interpolated with one another, according to a user-specified input that determines the relative proportion of each example image. An animation can be created by defining a sequence of such interpolated images. Alternatively, a user can directly manipulate observable components of an image to define a particular state for the image. Automatic transformations are defined to provide registration of an image within an overall scene by shifting the frame of reference for an image so that unnatural movements do not occur as the animation proceeds through a sequence of states. The structure of the system permits an animation to be divided into distinct components that can be combined with complementary components of other animations, to provide new results. These components include a clip motion which defines a sequence of states, a clip character which applies the clip motion to a particular image configuration, and clip art.

91 Claims, 12 Drawing Sheets

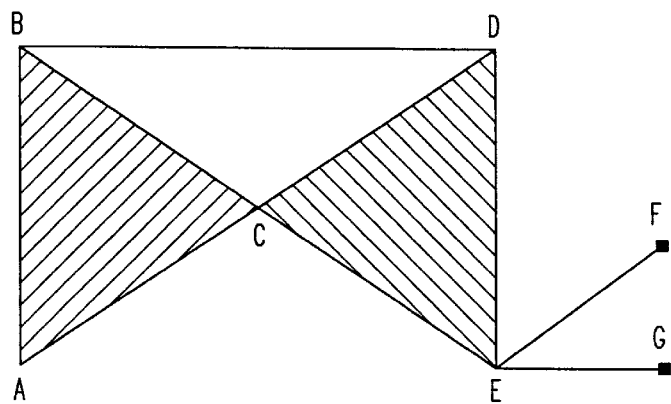
FIG. 4
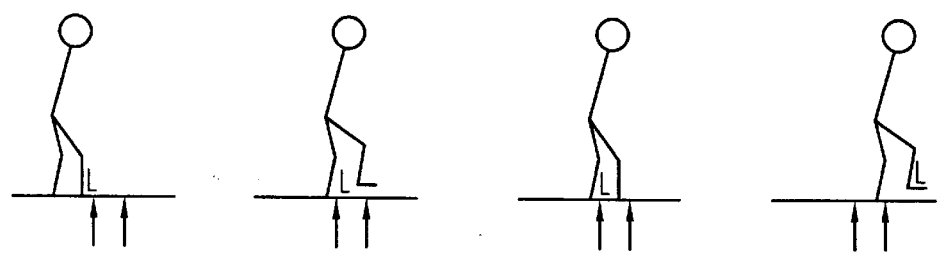
FIG. 5A  FIG. 5B  FIG. 5C  FIG. 5D

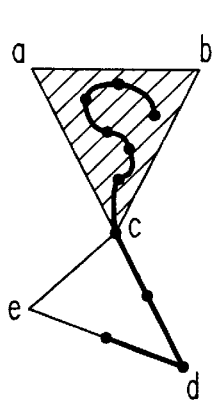
FIG. 22A
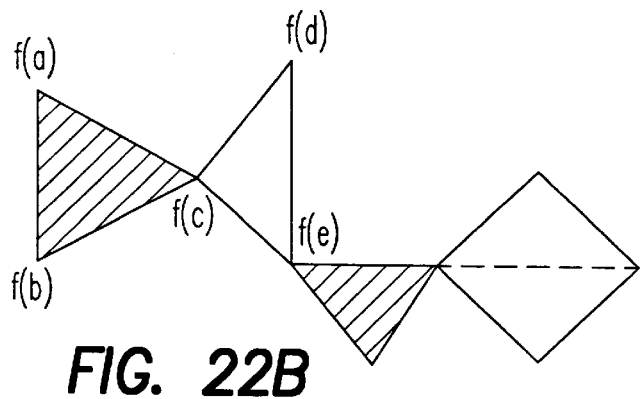
FIG. 22B
FIG. 22C
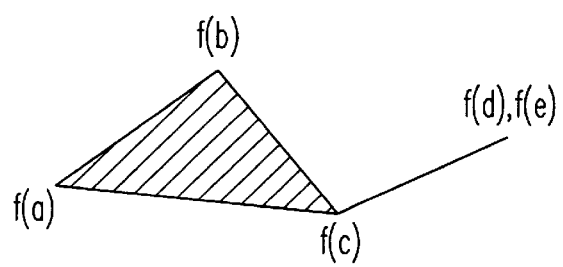
FIG. 23

SYSTEM FOR IMAGE MANIPULATION AND ANIMATION USING EMBEDDED CONSTRAINT GRAPHICS

FIELD OF THE INVENTION

The present invention is directed to computer graphic systems, and more particularly to a system which provides the ability for non-skilled computer users to manipulate graphic images for purposes such as creating animations or the like.

BACKGROUND OF THE INVENTION

With the expanding availability of higher powered computers to the average consumer, graphic images are becoming an increasingly prevalent component of the computer user experience. Consequently, it has become desirable for many users to be able to manipulate graphic images appearing on a computer display, for various purposes. For example, a teacher may desire to create a sequence of images to facilitate students' understanding of a particular concept. As another example, animations and other manipulations of graphic images might be used to enhance a business presentation, or convey a particular idea in a newsletter.

In the past, the manipulation of an image typically required the skills of a person having a substantial amount of experience with computer graphics. Although various types of graphics programs were available to the average user, these programs were not well suited to the easy manipulation of images, particularly for the creation of animations in which multiple graphic images smoothly flow from one state to another. For example, one type of widely used graphics program is known as a "paint" program. In this type of program, the graphic images are bitmap-based. In other words, each pixel in an image is defined by a numerical value. Manipulation of an image with one of these programs requires the user to redraw the portions of the image that change from one view to the next, without the full benefit of the effort that went into the creation of the first image. It can be readily appreciated that a procedure of this type is beyond the artistic abilities of the average user.

To facilitate work with graphic images, many programs employ various types of constraints. One widely-used type of program in this category is object-oriented graphics programs which are exemplified by various types of drawing programs. In these programs, graphic images are created with the use of primitives such as lines, rectangles and splines. Each primitive has two or more control points which the user can position as desired to create the image. For example, a line is defined by two control points at its respective ends. To move the line within the image, the user merely varies the position of one or both of its control points. Thus, rather than having to manipulate each pixel in the image, the user can work with a much smaller set of features to change the image from one frame to another. Even so, however, a substantial amount of effort is still required to modify images, particularly if they are complex, because each primitive must be individually positioned by the user. As a result, these programs are often not well suited for the creation of animations, or similar operations which require an appreciable number of changes in the images.

Another type of graphic program utilizes explicit geometric constraints to decrease the amount of effort required to change an image. One example of a constraint-based graphics system is disclosed in U.S. Pat. No. 5,390,294. In systems of this type, certain constraints can be explicitly defined by the user. For example, an end point of a line can be attached to a box or other object in an image, or two lines can be defined as being parallel. When one of the elements is moved, the other elements automatically follow it to maintain the relationship defined by the constraint. As a result, less effort is required on the part of the user to manipulate various components of an image. Again, however, the user is working with individual components, rather than the image as a whole. Moreover, the types of constraints available in such a system are ill-suited for animations outside the field of computer-aided mechanical design. Consequently, such a system may still prove to have insufficient capabilities and be too tedious to use for the average user, particularly in the case of an animation that consists of a substantial number of frames.

Other, more sophisticated constraint-based graphic systems have been developed for the purposes of creating animations or the like. Examples of such include programs which employ explicit algebraic constraints. Although these types of programs represent much more powerful tools for manipulating images, they also require a much higher level of skill. In addition, the approaches which they employ for the manipulation of images are not intuitive. As a result, they are not well suited for the average user of personal computers, who has neither the time nor experience necessary to create a pleasing end product with such systems.

One type of constraint-based graphic system utilizes inverse kinematics. Although such systems generally approach the ease of use sought in the development of the present invention, their application is limited to articulated figures, i.e., characters that can be modeled as collections of rigid rods connected by joints. Consequently, they do not meet the needs of the average user of a personal computer, which generally do not involve articulated figures.

A system which is particularly designed for the generation of an animation sequence by an average user of a personal computer is disclosed in U.S. Pat. No. 5,416,899. In this system, a set of two-dimensional views provide sparse data from which intermediate images can be generated by multi-target interpolation. The manipulation of complete views to define animation sequences, as opposed to individual primitives, presents an easier-to-use paradigm for the person creating the animation. Even in this case, however, the flexibility provided to the user is limited, due to the homogeneous dimensionality of the state space within which the views are defined. In addition, the user is required to manipulate independent parameters of the views. Such an approach is inherently non-intuitive, and therefore requires a certain amount of skill on the part of the user.

Other known techniques enable the user to directly manipulate the graphical images, and thereby provide a more intuitive approach. One such technique is described in a Ph.D. thesis by Michael Gleicher, "A Differential Approach To Graphical Interaction", CMU-CS-94-217, CMU School of Computer Science, 1994. In essence, the technique utilizes a Jacobian matrix to determine the relationships which graphical objects should occupy to conform to a given set of controls defined by the user. The Jacobian matrix varies arbitrarily with state, and therefore must be recomputed for each change of state. Hence, the resulting technique is computationally expensive and not particularly efficient. In addition, the types of relationships supported by such a system are only useful in a limited set of circumstances.

In addition to specific systems and programs, various software languages have also been developed for graphics and animation. Examples of such include Java, Condor and Inventor/VRML. Each of these languages supports the ability to produce constrained graphics, and possibly also direct manipulation of images. However, since they are languages, rather than end-user products, they require a high degree of skill, and are therefore not suited for the average user.

It is desirable, therefore, to provide a system which readily enables a computer user to manipulate a graphic image, for example to produce an animation or the like, in an intuitive and flexible manner without requiring a high skill level or significant amount of effort on the part of the end user.

SUMMARY OF THE INVENTION

In accordance with the present invention, the foregoing objective is achieved by means of a constraint-based graphics system in which different examples of an image define fundamental constraints of the system. Briefly, in accordance with the invention, a desired graphic image is generated by an author, or content producer, using any suitable graphics library. Variants of the image are also created by the author to provide specific examples that can be used for manipulation. The different examples have correspondence to one another in a manner that provides for meaningful interpolation between them. For instance, the examples could share a common set of control points whose locations may vary from one example to the next. Thus, the graphic image is parameterized.

The examples are grouped by the author into subsets whose elements can be mixed with one another. These groupings define a second level of constraint within the system. One of the advantageous features of the invention resides in the fact that the examples can be grouped in any desired manner to define a variety of different topologies, thereby offering a great deal of flexibility.

After the author has defined the example images and their groups, the result is provided to an end user who need not have any appreciable level of skill regarding the manipulation of graphic images. By selecting a subset and choosing a relative proportion of each example in the subset, the user specifies a state. The system mixes the examples in these proportions to create an image that is displayed. An animation can be created by the user, by defining a sequence of such states.

As a further feature of the invention, automatic transformations are defined by the author to provide registration of images within an overall scene. The automatic transformation shifts the frame of reference for an image, so that unnatural movements do not occur as an image transitions from one state to another. In essence, therefore, the automatic transformations define a third level of constraint within the system.

In accordance with another aspect of the invention, an image can be manipulated by means of two different approaches. In one approach, known as driving, a sequence of states is explicitly defined by the user. For each state, a corresponding configuration of control points is computed from which a displayable image is generated. In the second approach, known as tugging, the user interacts directly with the displayed image, rather than defining a sequence of states. The user designates a desired change in one or more parameters of the image, such as a color or the location of a control point. In response, the graphic system computes a state that causes the designated parameter to move as close as possible to the desired value. For this purpose, the original image can be provided with one or more control features that form handles via which the user can explicitly manipulate components of the image. For example, primitives which form the image can be grouped with a handle, such that when the user moves, or "tugs", the handle, the associated primitives also move. As another example, a handle can be associated with a parameter of an image, such as color, so that the parameter changes as the handle is moved by the user. In operation, for each new handle location designated by a user, the system computes a state sequence that causes the handle to move to the designated location.

The structure of the system permits an animation to be divided into distinct components. For example, these components can be a motion, which defines a sequence of states in a state space, a skeleton which applies the motion to a particular image configuration, and a skin which associates colors and shapes with the configuration to produce a tangible image. Within certain bounds, the individual components from different sets of example images can be combined with complementary components of other image sets, to provide new results.

These and other features of the invention, as well as the advantages offered thereby, are explained in greater detail hereinafter with reference to specific examples illustrated in the accompanying drawings.

BRIEF DESCRIPTION OF THE DRAWINGS

FIG. 4 is a diagram of another example of a combinatorial structure having a hole in its state space;

FIGS. 5A–5D illustrate another group of exemplary images that can be used to depict a person walking;

FIGS. 22A to 22C are exemplary state spaces for illustrating state space adapters;

FIG. 23 is a matrix for a state space cross product;

DETAILED DESCRIPTION

To facilitate an understanding of the principles and features of the present invention, it is described hereinafter with specific reference to relatively simple, two-dimensional graphic images. It will be appreciated that these particular examples are provided for illustrative purposes, and do not represent the only practical embodiments of the invention. Rather, the principles of the invention can be applied to a variety of different types of graphic images, to achieve a number of different results. Examples of other types of graphics to which the invention might be applied include three-dimensional images, morphed images and voxel graphics, for instance.

The present invention is directed to the manipulation of images in a computer, for display on a display device, such as a monitor, and/or printing in a document. While the particular hardware components of a computer system do not form a part of the invention itself, they are briefly described herein to provide a thorough understanding of the manner in which the features of the invention cooperate with the components of a computer system to produce the desired results.

Figure 1:
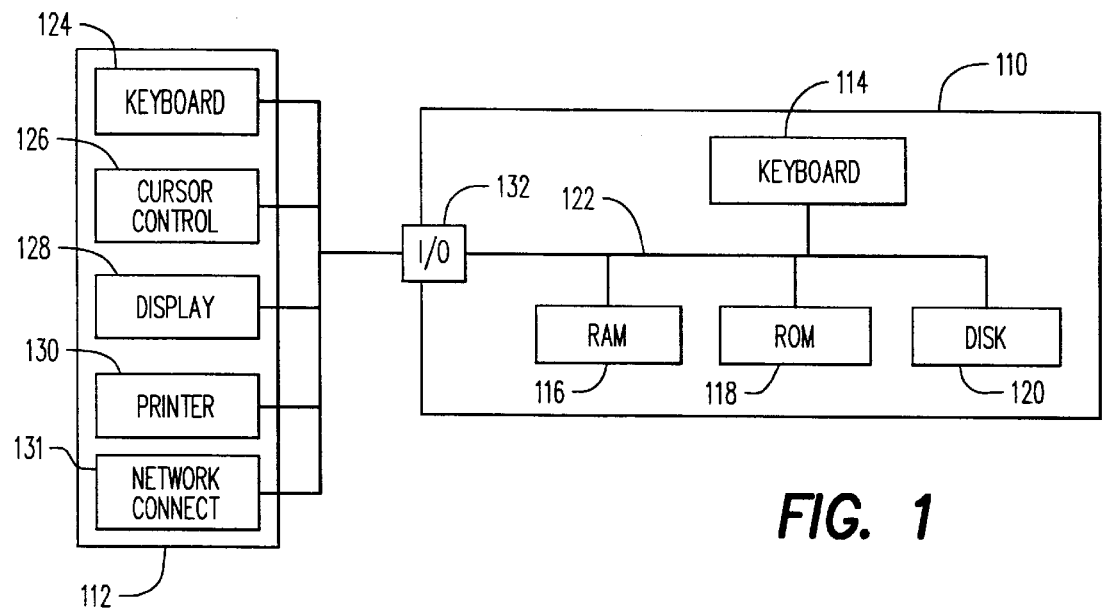
FIG. 1 is a general block diagram of an exemplary computer system of a type in which the present invention might be employed.

Referring to FIG. 1, the computer system includes a computer 110 having a variety of external peripheral devices 112 connected thereto. The computer 110 includes a central processing unit 114 and associated memory. This memory generally includes a main memory which is typically implemented in the form of a random access memory 116, a static memory that can comprise a read only memory 118, and a permanent storage device, such as a magnetic or optical disk 120. The CPU 114 communicates with each of these forms of memory through an internal bus 122. The peripheral devices 112 include a data entry device such as a keyboard 124, and a pointing or cursor control device 126 such as a mouse, trackball, pen or the like. A display device 128, such as a CRT monitor or an LCD screen, provides a visual display of the information that is being processed within the computer, for example a computer-generated image. A hard copy of this information can be provided through a printer 130, or similar such device. A network connection 131 enables the computer system to communicate with other, remotely located computers. Each of these external peripheral devices communicates with the CPU 114 by means of one or more input/output ports 132 on the computer.

General Concept

Figure 2A:
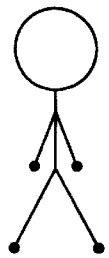
FIGS. 2A–2D illustrate examples of an image that can form the basis for an animation.

Generally speaking, the present invention is composed of two main aspects, namely an example-based authoring system via which a first entity defines the content and constraints of a set of images to be manipulated, and an underlying graphics engine which is responsive to input from an end-user, who is typically a different entity from the author, to manipulate displayed images. In such a system, several image examples are created, using any suitable drawing program, or the like. For example, FIG. 2A illustrates a simple stick figure that is created with an object-oriented drawing program. The primitives that are used to draw this figure comprise the lines for each of the body components, and a circle for the figure's head. The image of FIG. 2A is a parameterized image since it can be described by a set of configuration parameters. In this particular example, the configuration parameters might be control points which define each of the primitives, such as the (x,y) locations of the end points of each of the lines. A control point is illustrated at the ends of each of the arms and the legs.

Figure 2B:
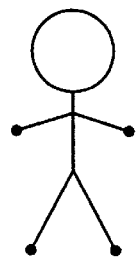
Figure 2C:
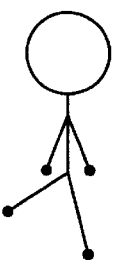
Figure 2D:
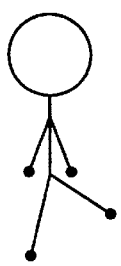

In FIGS. 2A–2D, the stick figure is drawn in four different poses. Specifically, in FIG. 2A, the figure is in a standing position with its arms at its sides, and in FIG. 2B its arms are outstretched. In FIG. 2C the figure has its right leg raised, and in FIG. 2D the left leg is raised. Each of these different poses constitutes an image example that defines the first level of constraints in the graphics system. Each of the examples of FIGS. 2B–2D can be created by modifying the original image of FIG. 2A, for example by moving the illustrated control points at the ends of the arms and the legs, as appropriate.

After the image examples have been created, they are grouped by the author into subsets of examples that are permitted to be interpolated with one another. In the exemplary embodiment of FIGS. 2A–2D, the image examples of FIGS. 2A, 2B, and 2C form one subset, and the examples of FIGS. 2A, 2B, and 2D, form another subset. In this particular illustration, it is not desirable to have both of the images of FIGS. 2C and 2D in the same subset, since an interpolation between the two of them would result in a figure in which each leg was at least partially raised, and hence the figure would appear to be floating off the ground. Of course, in another example such a result might be acceptable, in which case the designer would not impose such a constraint upon interpolation.

Figure 3:
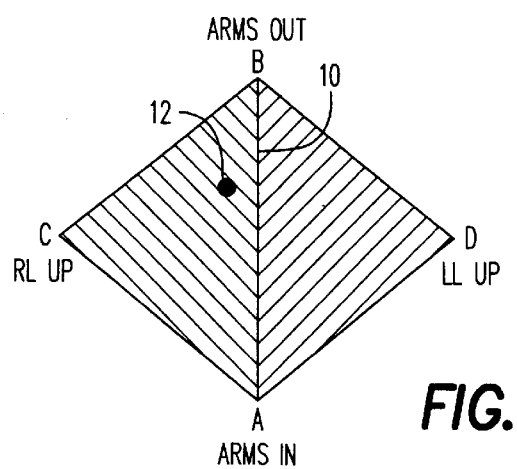
FIG. 3 is a diagram of one combinatorial structure that can be derived from the images of FIGS. 2A–2D.

The various image examples can be associated with one another in a manner that defines a topological data structure which identifies their relationships. An example of such a data structure for the images of FIGS. 2A–2D is shown in FIG. 3. Referring thereto, each of the four image examples is associated with a vertex of a geometric shape. Specifically, the three image examples of FIGS. 2A, 2B, and 2C, which form one subset, define a triangular shape. The second subset, comprising the examples of FIGS. 2A, 2B, and 2D, defines a second triangle. Since the examples of FIGS. 2A and 2B are shared between the two subsets, the two triangles are joined along a common interface. Each subset of examples constitutes a simplex, or zone, and all of the zones together form a combinatorial structure, or state space, known as a simplicial complex. In the case illustrated in FIG. 5, the state space is composed of two triangular zones, ABC and ABD. While both zones in this case are two-dimensional structures, it is also possible for a state space to include one-dimensional zones, i.e. a line whose end points are defined by two examples, as well as multi-dimensional zones such as a tetrahedron defined by four examples.

The combinatorial structure defines a state space for the graphics system. Any given point within this space defines a particular image, and movement within the state space causes the appearance of the image to change. More particularly, each of the vertices corresponds to one of the image examples shown in FIGS. 2A–2D. A point located between two vertices results in an interpolated image comprised of a representative portion of each of the two images associated with the respective vertices. Thus, as one moves from the lowest vertex A in the structure of FIG. 3 up the vertical line 10 to the highest vertex B, the figure's arms smoothly move from the position shown in FIG. 2A to that shown in FIG. 2B. Movement from the lowest vertex A to the left vertex C causes a transition in the image from that of FIG. 2A to that of FIG. 2C. A point located somewhere within the triangle defined by the three vertices A, B and C corresponds to an image in which the arms are partially raised and the right leg is partially lifted. For example, the point 12 represents a position in which the image is a weighted composite consisting of 60% of FIG. 2B, 30% of FIG. 2A and 10% of FIG. 2C. The percentages sum up to unity, and the weight values which correspond to these percentages, i.e. 0.6, 0.3 and 0.1, constitute a vector in barycentric coordinates. In a relatively simple embodiment of the invention, the examples are interpolated linearly; but in a different embodiment, the interpolation could employ non-linear functions, such as cubic polynomials. Any state s within the state space can be specified by a zone, in this case the zone containing the examples A, B and C, together with the vector, i.e. [0.3, 0.6, 0.1].

In the example of FIGS. 2 and 3, the possible states can lie at any vertex (and comprise a single image example), along the edges of the zone (comprising a combination of two image examples), or within the interior of a zone (comprising a combination of three images). In this case, the triangles which define the zones are filled, as depicted by the shading in FIG. 3. In another example, a designer may specify that the possible states can only be defined by a maximum of two images. In such a case, the triangle will be hollow, rather than filled, and be constituted by three 2-example zones. The two zones ABC and ABD are referred to herein as being adjacent one another since they share at least one vertex. In addition, the entire structure defined by the state space is said to be connected since, for any two zones X and Y, there exists a sequence of zones Z1, Z2 ... Zn such that X is adjacent to Z1, Z1 is adjacent to Z2, ..., and Zn is adjacent to Y.

FIG. 4 illustrates a combinatorial structure composed of zones of various different dimensions. Two 2-dimensional zones, ABC and CDE, define filled triangles. The structure also includes three one-dimensional zones, BD, EF and EG. Although the edges BC, CD and BD of three zones form a closed shape, this shape is not filled, to indicate that a state cannot be composed of a combination of three example images B, C and D. Thus, the state space can include one or more holes, i.e. an area within the state space that does not correspond to a definable state. A path in the state space may comprise a cycle that goes around a hole, such as the path BCDB.

In a relatively simple embodiment of the invention, the set of all zones can be manually defined by the designer. For this purpose, the authoring system can provide the designer with four basic commands, namely add a zone, delete a zone, insert an example into a zone and remove an example from a zone. Through these four commands, the designer can set up the state space to have any desired structure. Alternatively, it is possible for the set of zones to be generated automatically or semi-automatically. For example, one automatic approach to the generation of the set of zones is to define some objective measure of the similarity among the various examples, such as their Euclidean distance in a geometric configuration space or a Hausdorff metric in an image space, and to automatically generate a zone from any collection of examples which all exceed some fixed similarity threshold. In one possible semi-automatic approach, the user can vary the similarity threshold that is used in various parts of the configuration space. In another semi-automatic approach, the example images are grouped in various combinations which are presented to the author, using automatic classification approaches, such as version space. The author can indicate his or her likes and dislikes regarding images that can be produced with the given combinations. Based on the feedback from the author, a final grouping of zones is then selected.

For each zone, the designer can specify a parameter Z which defines the appearance of an image. For example, the parameter might be a stacking value that identifies which graphic primitives are invisible, and among those that are visible, a stacking order, i.e. if two or more primitives overlap, which one obscures the view of the others. In accordance with the invention, the stacking order or other parameter need not be the same for all of the zones in the combinatorial structure. Rather, each zone can have a different parameter for the primitives, so that the displayed image changes as the viewer switches from the images in one zone to those in an adjacent zone.

Preferably, the set of all author-defined zones should conform to the following constraints:

1. Every vertex should appear in at least one zone. Otherwise, some of the example images will never be used.

2. The set of zones should be connected. If they are not, some of the images will be inaccessible.

3. Every zone must contain at least two vertices. In addition, no zone should be defined by the author which is a subset of any other zone. Otherwise, some zones will be superfluous and certain operations may be ambiguous.

Once a number of states for a set of images has been defined, the user can designate a sequence of states ($s_1$, $s_2$, $s_3$ ...) to create an animation. For an animation which contains a series of repeating motions, the same sequence of states can be recalled in a cyclic fashion. One example of such a situation is a walking motion. FIGS. 5A–5D illustrate four example images that can be used to produce a bipedal walk cycle. In FIG. 5A, both feet are planted on the ground, with the left foot forward. In FIG. 5B, the left foot remains planted and the right 5 foot is lifted. In FIG. 5C, both feet are again planted, but with the right foot forward. Finally, in FIG. 5D, the right foot remains planted and the left foot is lifted. By defining a sequence of states which continually cycles through these four examples, the figure can be made to appear as if it is walking in a continuous motion.

Transformations

One problem associated with the reuse of an image in a sequence, for example to produce the effect of continued motion, relates to registration of the successive images. Referring to FIGS. 5A–5D, the positions of the left and right feet, when they are planted against the ground, are indicated with two arrows. It can be seen that, in the transitions from FIGS. 5A through 5B and 5C to FIG. 5D, the feet remain at the proper positions. This is due to the fact that the different images are originally drawn at the proper positions relative to a particular frame of reference, indicated by the two arrows. However, during the next cycle, the transition from FIG. 5D to FIG. 5A will produce a "moonwalking" effect if FIG. 5A is displayed in its original frame of reference. In other words, the right foot will slip back to its original position at the start of the first walk cycle as the left foot lands on the ground. Thus, while the character appears to be walking, any forward progress made during the first three phases of the cycle is lost during the transition from D back to A in the fourth phase.

To compensate for this effect, some action must be taken to translate the next instance of the image at FIG. 5A by one pace with respect to the original instance of that image. By doing so, the second instance of the image of FIG. 5A is brought into registration with the first instance of the example image of FIG. 5D. In accordance with the present invention, this registration is brought about by specifying an automatic transformation from FIG. 5D to FIG. 5A. In essence, in this particular example the automatic transformation functions to shift the frame of reference for the images, e.g. paper or other medium on which the figures were originally drawn, by the distance of one pace to the right. More generally, the transformation of an image during the progression from one state to another involves scaling the image by a scale factors, rotating the image by a rotation angle θ about some origin, and performing a two-dimensional translation by a displacement value (x,y). Any element of a transformation can be applied to any control point within an image by scaling the control point about the origin, rotating the point about the origin, and translation of the control point. In the illustrated example, the automatic translation causes the paper to slide forward in such a way as to prevent the right foot from appearing to slip.

Figure 6A:
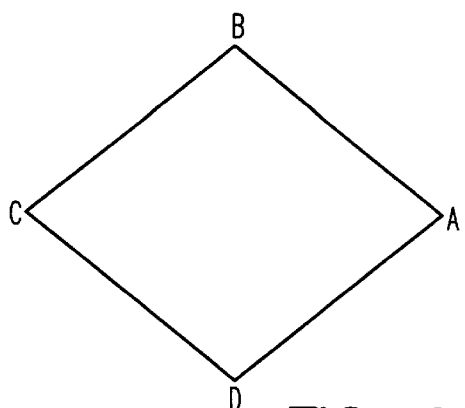
FIG. 6A illustrates the effect of cyclic use of a series of images to depict a repeating action, without an automatic transformation.

In the simple example of FIGS. 5A–5D, only one of the four elements of a transformation is needed, namely translation in the x direction. The effect of the automatic transformation is depicted with reference to FIGS. 6A and 6B. FIG. 6A represents a walking sequence that is produced by cycling through the four examples of FIGS. 5A–5D. In this case, no automatic transformations take place. As a result, as the sequence shifts from the image of FIG. 5D to that of FIG. 5A, the frame of reference for the image returns to the origin. As noted previously, this type of operation can result in a "moonwalking" effect.

Figure 6B:
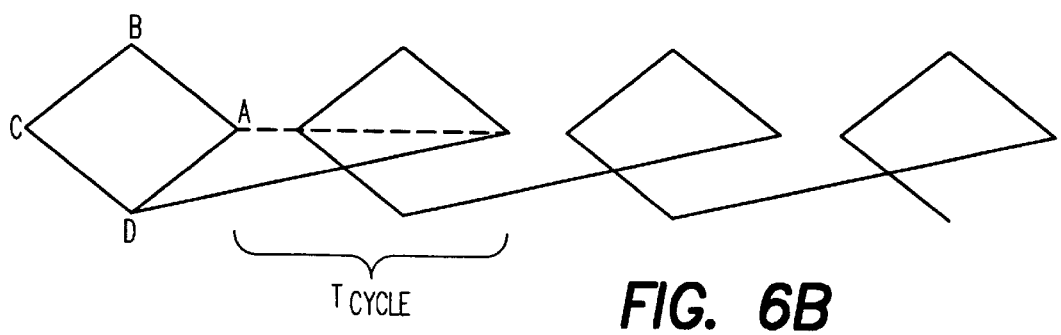
FIG. 6B illustrates the effect of cyclic use of a series of images to depict a repeating action, using an automatic transformation.

FIG. 6B illustrates the effect that is achieved when an automatic transformation is employed. In this case, the automatic transformation specifies a horizontal translation of the frame of reference by a distance equal to the length of one complete step. Thus, in the transition from the image of FIG. 5D to that of FIG. 5A, the frame of reference is shifted by an amount $T_{cycle}$, which is specified by the automatic transformation. As a result, the character appears to be moving forward across the scene being displayed.

Automatic transformations can be arbitrarily defined to provide certain desired effects within the graphics system. In the walking example of FIGS. 5A–5D, each zone is one-dimensional, having two examples per zone. In this case, the appropriate transformation is relatively straightforward. As the combinatorial structure becomes more complex, with higher dimensional zones, more varied types of transformations can be employed. Thus, for example, in a two-dimensional zone the set of transformations can be expressed in the form of a matrix under one set of circumstances, as explained hereinafter.

The automatic transformations which are employed in the graphics system can be classified into the following four different types, which are described below:

1. None at all;
2. Conservative transformations for both intra-zone and inter-zone state transitions;
3. Conservative transformations for intra-zone transitions and non-conservative transformations for inter-zone transitions between adjacent zones; and
4. Non-conservative transformations for both intra-zone and inter-zone transitions between adjacent zones.

The first case, in which there are no automatic transformations, is the easiest to implement, but also the most restrictive in terms of results that can be obtained. When there are no automatic transformations, an image always appears in the same frame of reference as the one in which the examples were created. In the illustrative example of FIGS. 5A–5D, the walking figure would always return to the same position, rather than being transported across the viewed scene. Consequently, this case is most suitable for static images, such as clip art which is defined by a single state in the state space.

Figure 7:
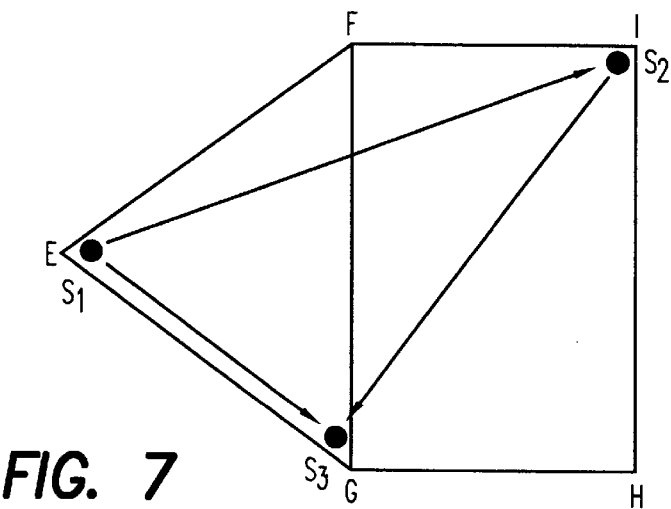
FIG. 7 is a diagram of a combinatorial structure in which fully conservative transformations are employed.

The second category, fully conservative transformations, ensures that the transformation between any two states in adjacent zones will always be the same, regardless of the particular path that is used to make the transition between the states. Referring to FIG. 7, when going from state S1 to state S2 across two adjacent zones, the automatic transformation may require the image to be translated by a value (x, y). If the image goes from state S1 to state S3, and then to state S2, in a fully conservative system the net transformation is the same, i.e. translation by the amount (x,y).

Figure 8A:
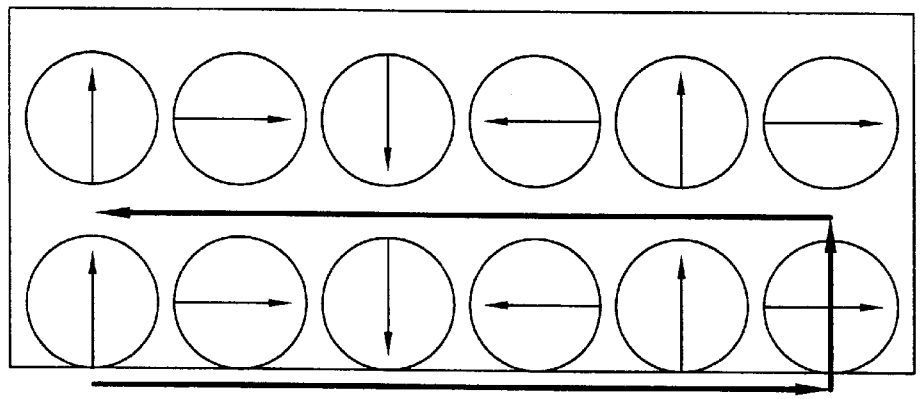
FIG. 8A and 8B are illustrations of examples in which conservative and non-conservative inter-zone transformations are employed, respectively.
Figure 8B:
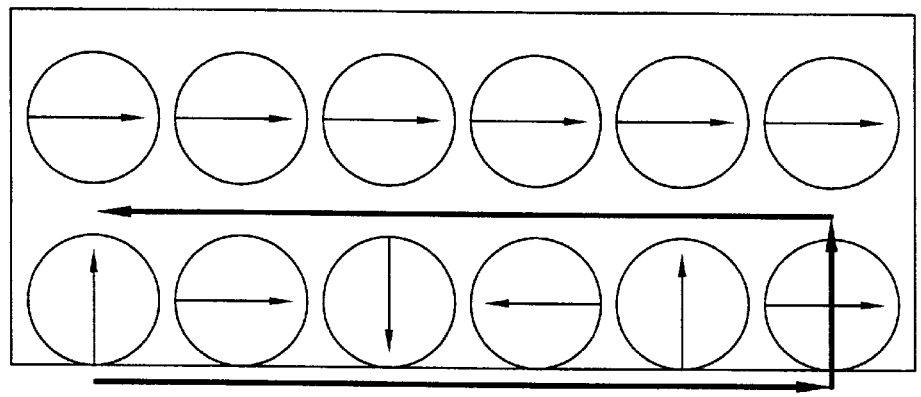

While these results are useful in some instances, such as the exemplary walk cycle of FIGS. 5A–5D in which the sequence of states forms a closed path around a hole, there may be other situations in which the resulting effect is not desired. For example, FIGS. 8A and 8B depict a sequence of images in which a wheel is rolled along the ground from left to right, and then lifted into the air and returned to a location above its original position. In this example, the automatic transformation specifies rotation of the image of the wheel. FIG. 8A illustrates a fully conservative implementation of automatic transformation. As can be seen, when the wheel finished rolling on the ground, the image is in a state where the directional arrow points to the right. As the wheel is translated back to its original position in the air, it rotates in the opposite direction so that it is in the same rotational position as it was at the beginning of the cycle.

Figure 9:
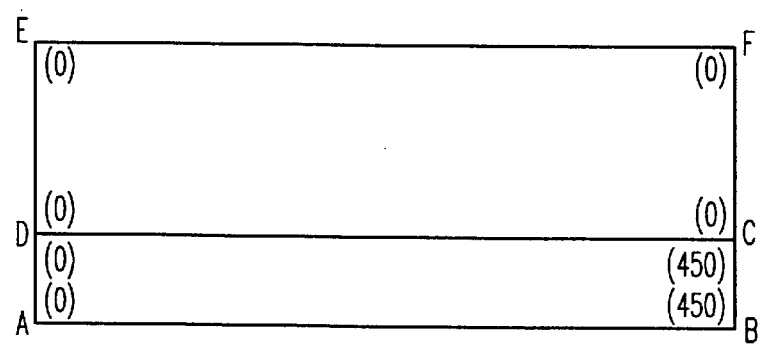
FIG. 9 is a diagram of the state space for the examples of FIGS. 8A and 8B.

In reality, of course, the wheel does not rotate backward while it is being transported in the air. To accommodate such a situation, separate zones are defined for the states in which the wheel is on the ground and when it is in the air. Non-conservative inter-zone transitions are employed to differentiate between these two different situations. The state space for this example is illustrated in FIG. 9, and the resulting display is shown in FIG. 8B. In this example, the image of the wheel is in one zone ABCD while it is on the ground, and in a different zone CDEF while in the air. As the wheel travels along the ground, one set of transformations apply, i.e. the wheel rotates as it is being translated. This transformation is indicated by the value 450, to indicate that the wheel rotates 450° in the clockwise direction, at vertex B. While in the air-related zone CDEF, however, a different set of transformations, in this case zero transformations, are employed so that the wheel does not rotate.

In the example of FIGS. 8A and 8B, the transformations are conservative within a given zone, but non-conservative at the junction between adjacent zones. The zone which is applicable depends upon whether the wheel is touching or not touching the ground. In the example of FIG. 9, the zone ABCD is illustrated as having an appreciable height, for ease of understanding. In practice, the difference between the images at vertices A and D, as well as at vertices B and C, is minimal since, as soon as the wheel is lifted, the state enters zone CDEF.

Figure 10:
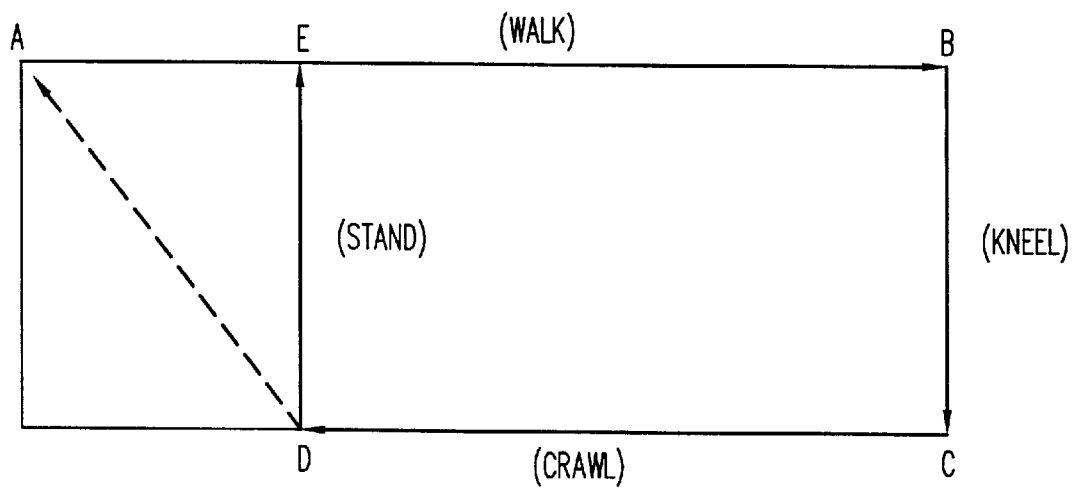
FIG. 10 is an illustration of a state space in which non-conservative inter-zone transformation is employed.

In some cases, it may not be appropriate to include in the state space an abrupt difference in the behavior of the automatic transformations, in a manner analogous to the ground/air dichotomy described above for the case of the wheel. In this situation, non-conservative transformations which occur within a zone, rather than only at the boundaries of zones, are employed. FIG. 10 illustrates the path that can be followed by a point on an image of a person who can move by walking or crawling, e.g. a point on the person's hip. Traversing the top edge of the path causes the person to go through a walk cycle, for example as shown in FIGS. 5A–5B, while traversing the bottom edge causes the person to go through a crawl cycle in which the person moves on his or her hands and knees. Movement from the top edge to the bottom edge causes the person to go from a standing position to a kneeling position, and vice versa.

If the person walks forward one cycle (A to B), bends down to a kneeling position (B to C), crawls backward one cycle (C to D) and then stands up (D to E), the image of the person should not be in the same place as where it began, since the distance traversed by a crawl cycle (CD) is less than that of a walk cycle (AB). If the intra-zone transformation is conservative, the person would appear to "slide" back to position A as he or she stands up, as represented by the dashed line. Non-conservative intra-zone transformations cause the frame of reference with respect to which the person is drawn to shift in a manner which prevents this slippage.

In the case of conservative intra-zone transformations, each vertex in the zone is assigned an automatic transformation value. If a vertex is associated with two or more zones, it can be assigned a different transformation value for each zone. To determine the transformation value for any point in the zone other than a vertex, the values for scale, rotation and displacement are interpolated in accordance with the proportional weights of the vertices at the point of interest, for example in a linear manner. Thus, any state s has an associated transformation value T(s). When transitioning from state $s_1$ to state $s_2$, the automatic transformation changes by adding the value of $T(s_2)-T(s_1)$ to the transformation value for the previous state.

Figure 11:
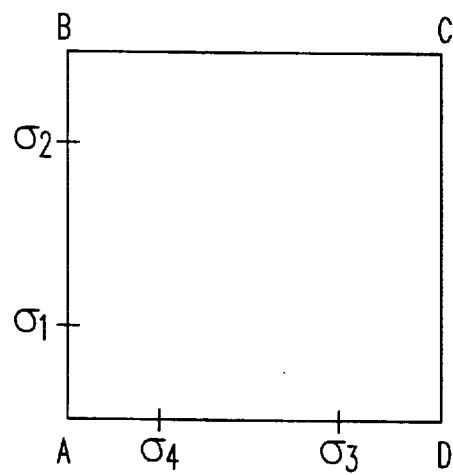
FIG. 11 is a diagram of the state space for the walk cycle of FIGS. 5A–5D.

For example, the walk cycle of FIGS. 5A–5D comprises four one-dimensional zones containing vertices AB, BC, CD and DA, respectively, as shown in FIG. 11. Vertex A has a transformation value equal to translation by one full walk cycle in zone DA. Otherwise, every vertex has a zero transformation value in every zone, including vertex A in zone AB. Thus, when moving from state $s_1$, composed of 75% A and 25% B, to state $s_2$ composed of 25% A and 75% B, the frame of reference, e.g., piece of paper, does not move. However, when moving from state $s_3$, composed of 75% D and 25% A, to state $s_4$, composed of 25% D and 75% A, the frame of reference shifts by one-half of a walk cycle, to negate any backward movement.

Figure 12:
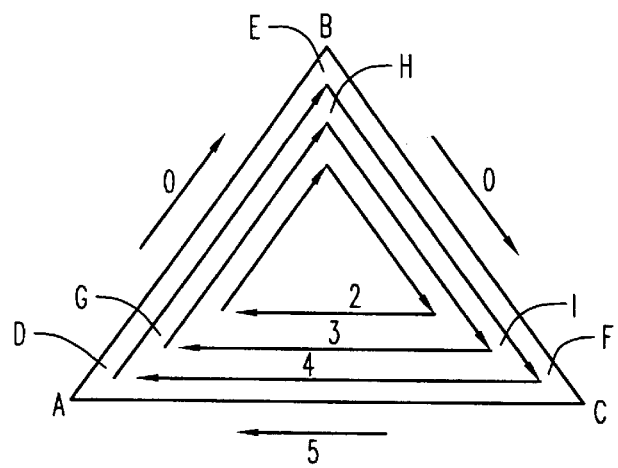
FIG. 12 is another illustration of a state space in which non-conservative inter-zone transformation is employed.

For non-conservative intra-zone transformations, every pair of vertices in the zone is connected by an edge. Referring to FIG. 12, the illustrated zone is defined by the three vertices A, B and C which define the edges AB, BC and CA. An automatic transformation is associated with each edge, and is referred to herein as an edge transformation. In this case, each transformation is labeled $T_{ij}$ where i and j are the two vertices. In the example of FIG. 12, the edges AB and BC have automatic transformation values of zero, whereas edge CA has an automatic transformation value of +5, in the direction from vertex C to vertex A, i.e., $T_{CA}=5$.

In the preferred embodiment of the invention, the automatic transformation values are defined to be antisymmetric; consequently, $T_{AC}=-5$. In this particular example, the transformation is represented by a single factor, which might be translation in one cardinal direction, for example. In practice, of course, the transformation value can include all of the previously described factors for scale, rotation and translation.

Figure 13:
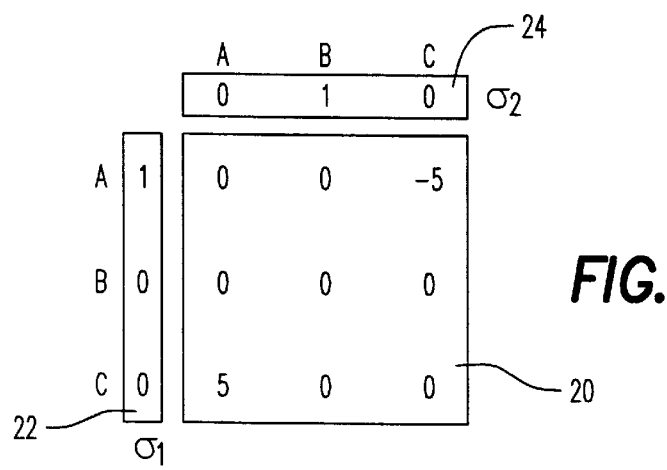
FIG. 13 is an illustration of a matrix which is utilized to calculate a non-conservative inter-zone transformation.

The automatic transformation in going from any given state $s_1$ to another state $s_2$ within the same zone can be determined through matrix multiplication. Referring to FIG. 13, the values of the edge transformations are represented by a matrix 20. Each of the beginning and ending states is represented by a vector 22, 24, respectively, which identifies the weight of each of the three examples in the state. The specific example indicated in FIG. 13 pertains to a transition from vertex A (vector 1,0,0) to vertex B (vector 0,1,0). The value of the automatic transformation is determined by matrix multiplication, which in this case gives a value of 0. For a transition from vertex A to vertex C (vector 0,0,1), it can be seen that the result would be −5.

Figure 14:
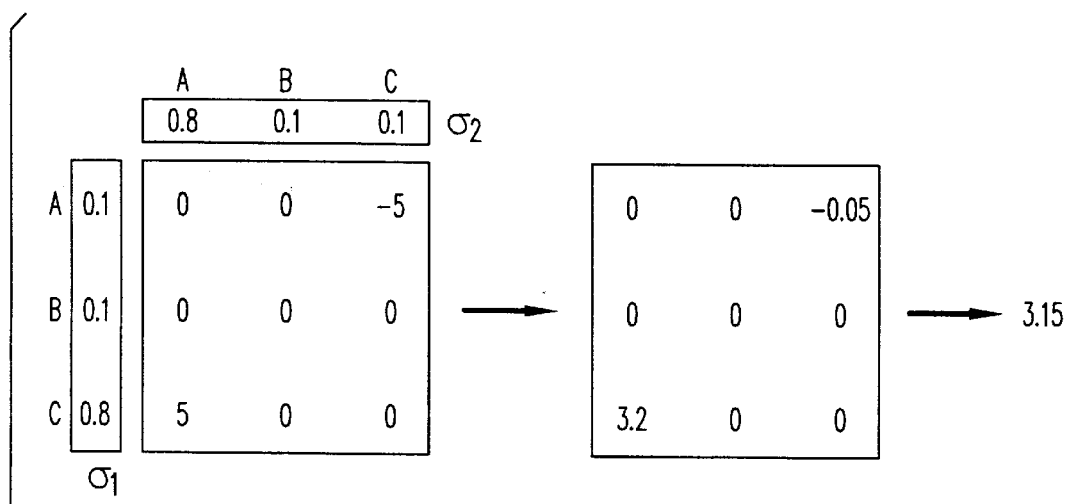
FIG. 14 is another example of the calculation of a non-conservative inter-zone transformation.

For transitions which take place within the interior of the zone, rather than at the edges thereof, the value of an automatic transformation should be proportional to the length and direction of the path that is followed. Referring again to FIG. 12, path ABCA has a net transformation value of 5, path DEFD has a transformation value of 4, path GHIG has a transformation value of 3, and so on. FIG. 14 illustrates an example in which a transition is made from state $s_1=10\%$ A, 10% B, 80% C (which is approximately point I in FIG. 12) to state $s_2=80\%$ A, 10% B, 10% C (approximately point G). The multiplication of the state vectors by the transformation matrix results in an automatic transformation having a value of 3.15.

The matrix-based description of non-conservative automatic transformations given above is based upon the mathematical technique of path integration. This technique may be used to arrive at an alternative description of non-conservative automatic transformations that does not involve the use of matrices. Under this approach, the automatic transformation accumulated during the transition from one state $s_1$ to another state $s_2$ in the same zone is defined by the following path integral:

$$\int_\alpha V \cdot ds$$

where $\alpha$ is a path from $s_1$ to $s_2$ in the zone and V is a vector field defined on the interior and the boundary of the zone, which is referred to herein as the transformation vector field. The numerical values of the vector field are taken from constraints. In a preferred embodiment of the invention, these constraints are:

1. V is linear in the barycentric coordinates.
2. When the path a coincides with an edge from a vertex $v_1$ to a vertex $v_2$ in the zone, the value of the integral is equal to the edge transformation associated with the vertex pair $(v_1,v_2)$ in the zone, which is anti-symmetric, i.e. the automatic transformation when going from $v_1$ to $v_2$ is exactly the opposite of the automatic transformation when going from $v_2$ to $v_1$.

Figure 15:
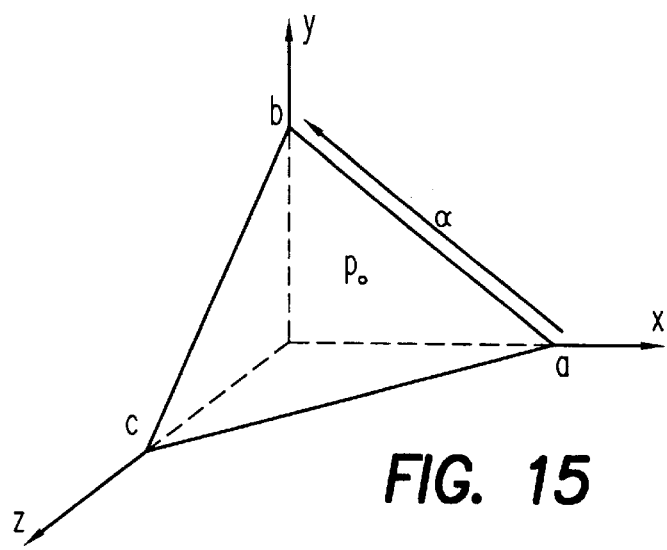
FIG. 15 is an example of a zone for illustrating a path integral.

The foregoing will be illustrated with reference to an example depicted in FIG. 15. This example depicts a two-dimensional zone with vertices a, b and c. $T_{ab}$ is the transformation between a and b, and $\alpha$ is a path from a to b along the edge of the zone. The objective is to find a three-dimensional vector field V defined such that:

$$\int_\alpha V \cdot ds = T_{ab}$$

where V is a vector field that is linear in the barycentric coordinates. In general, the dimension of V must be at least that of the zone.

The value of V at the vertices a, b and c can be represented by three dimensional vectors A, B and C, respectively, such that V(a)=A, V(b)=B, and V(c)=C. Since V is linear, A, B and C completely determine V. The values for A, B and C can be chosen in the following manner. In the example of FIG. 15, the barycentric coordinates for the vertex a are (1,0,0), the coordinates for the vector b are (0,1,0), and $T_{ab}$ has a value of 7. The path α can be written in barycentric coordinates as:

α(t)=(1-t, t, 0)

In this case, the solution becomes:

$$\int_\alpha V \cdot ds = \int_0^1 V(\alpha(t)) \cdot \alpha'(t) dt = T_{ab} = 7$$

It can be seen that this solution yields a linear equation

Ay−Ax+By−Bx=14 where A=(Ax, Ay, Az)

B=(Bx, By, Bz)

A similar path integral can be obtained for each edge, and in each case a linear equation on the components of V is obtained. These linear equations form a matrix. If the condition holds that, for each edge, $T_{ab}=-T_{ba}$, the matrix is anti-symmetric, as shown in the examples of FIGS. 13 and 14. The path integral can be used to calculate the automatic transformation for any path in the zone, including smooth paths, i.e. those which are not piecewise linear. It is also useful for paths that are splines, for example. In the case of linear paths, however, the automatic transformations reduce to the matrix computation described above.

It will be observed that calculating the path integral can be reduced to the matrix based description given above. Thus, alternative approaches to the use of non-conservative automatic transformations that are based on this technique of path integration, but do not use matrix-based descriptions, are within the scope of the invention.

Figure 16:
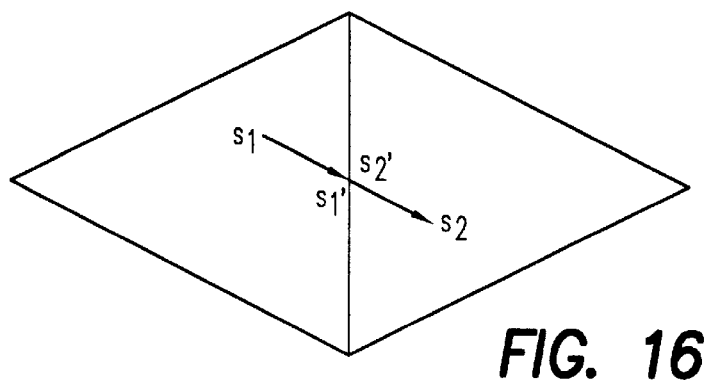
FIG. 16 is a state space diagram illustrating an inter-zone transition of state.

For a transition that moves from a state $s_1$ in one zone to a state $s_2$ in an adjacent zone, the automatic transformation is computed in three steps. This inter-zone movement is depicted in FIG. 16, and the state assignments are illustrated in Table 1 below. First, the state is changed from $s_1$ to a state $s_1'$ which is on the boundary of the first zone, using the rule heretofore described for movements within a zone. Second, the state is changed from $s_1'$ to a state $s_2'$ on the boundary of the second zone, without any change to the automatic transformation. Finally, the state is changed from $s_2'$ to $s_2$ using the rule for movement within a zone. The states $s_1'$ and $s_2'$ are identified herein as via points, and represent equivalent points in the two zones. Two states are said to be equivalent if they have the same relative proportions for all of the examples shared between the two zones, and zero for all of the examples in either zone that are not shared. The foregoing approach applies whether the intra-zone transitions are within a conservative or non-conservative zone.

TABLE 1

|      | A   | B   | C   | D   |
|------|-----|-----|-----|-----|
| $s_1$  | .25 | .5  | .25 | —   |
| $s_1'$ | .5  | .5  | 0   | —   |
| $s_2'$ | .5  | .5  | —   | 0   |
| $s_2$  | .5  | .25 | —   | .25 |

As noted previously, an animation is created by designating a sequence of states. In the context of the present invention, the animation can be defined in two different manners. In one manner, known as driving, the user operates within the state space of the system. In essence, the user explicitly defines a sequence of states $s_0, s_1, \ldots s_n$, where $s_i = (z_i, \lambda_i)$, in which $z_i$ designates a zone and $\lambda_i$ represents the weights of the component examples associated with that zone. In the driving mode, the system sequentially progresses through each of the designated states. This can be done automatically, or under user control, e.g. by moving slider bars or other such graphical devices.

During driving, the automatic transformations preferably track the state sequence. In the conservative intra-zone case, as the animation transitions from state $s_1$ to $s_2$, the automatic transformation T undergoes a similar transition, by adding the value of $T(s_2)-T(s_1)$ to the current transformation value. In other words, the difference between $T(s_1)$ and $T(s_2)$ is computed as described above, and applied in a transition from $s_1$ to $s_2$.

Figure 17:
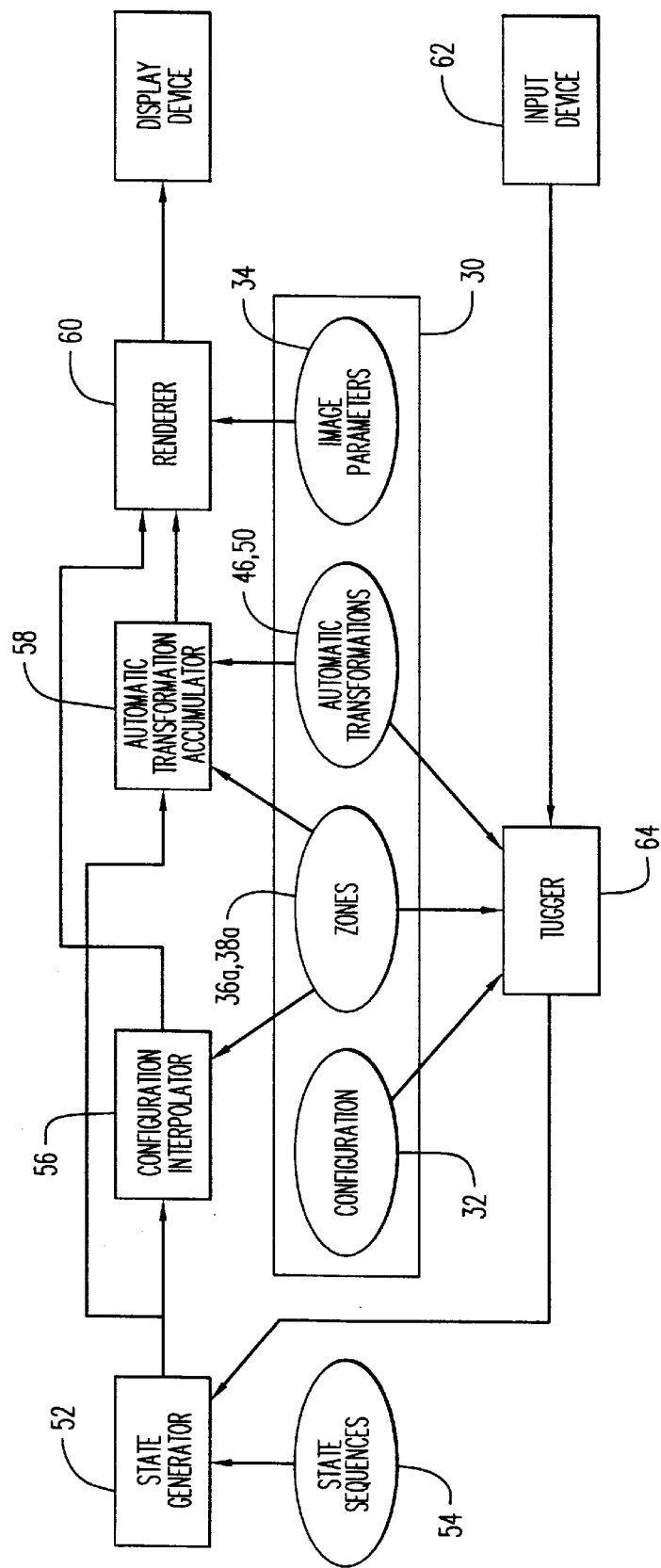
FIG. 17 is a block diagram of the overall system of the present invention.

A general block diagram which depicts the overall structure and operation of the graphics system of the present invention is illustrated in FIG. 17. Referring thereto, the basic features of the system are defined by a model 30 which is designed by the author. This model is composed of four basic components. Two of these components, the configuration space 32 and the parameterized image 34, are determined by the image examples. The configuration space comprises the values of the control points which define an image. Thus, if an image is made up of various primitives, each element of the configuration space contains information which defines the locations of the control points for those primitives, e.g. end points of lines, centers of circles, etc. The image parameters 34 indicate how color, e.g. texture, is applied to these primitives to produce the final image. The other two components of the model comprise the topological structure, or state space, which determines the zones, and the automatic transformation space, as described previously.

Figure 18A:
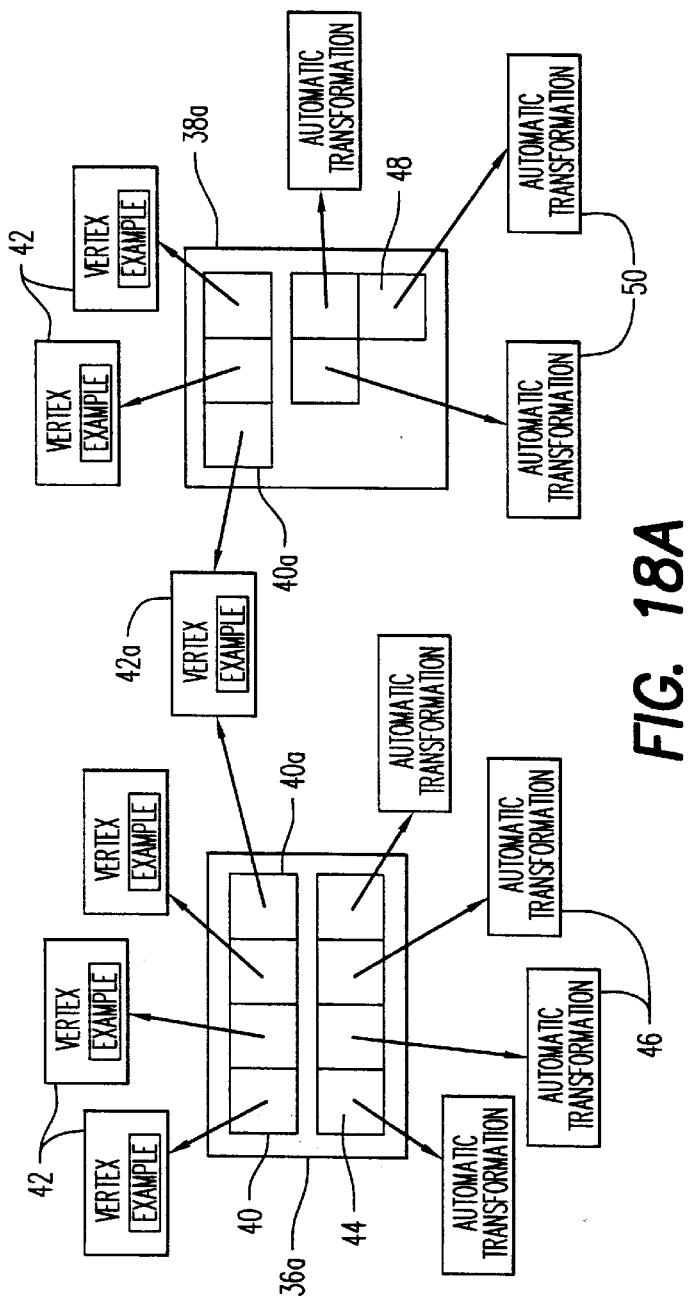
FIG. 18A is a block diagram of a data structure for storing information relating to a model.
Figure 18B:
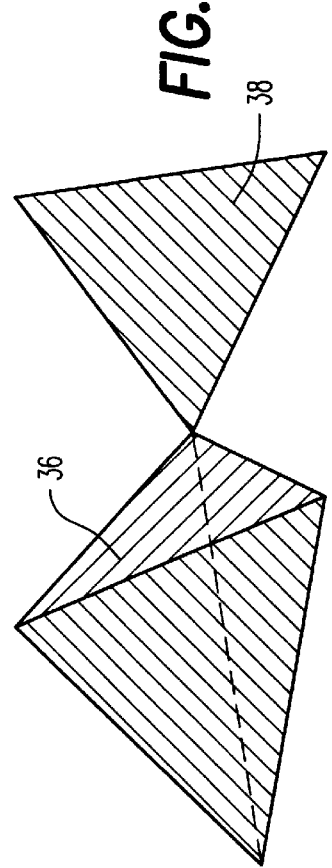
FIG. 18B is an illustration of the model depicted in the example of FIG. 18A.

One possible data structure for storing the information which defines a model in the memory 16 and/or 20 of the computer is illustrated in FIG. 18A. This particular data structure relates to a state space such as that shown in FIG. 18B, which comprises two zones 36 and 38. Zone 36 contains four examples, and defines a tetrahedral structure. Zone 38 contains three examples which define a triangle. These two zones share one common example, or vertex. Referring to FIG. 18A, the data structure includes a separate record 36a, 38a for each zone. Each record contains pointers 40, or similar such references, to the examples 42 in the zone. Since zones 36 and 38 contain a common vertex, their records both include a pointer 40 a to the same example 42a. These records might be created in response to commands entered via the authoring system, as described previously.

The record for each zone also contains pointers which refer to the automatic transformations for the zone. In this particular example, zone 36 includes conservative automatic transformations. As such, each vertex has an associated pointer 44 to an automatic transformation 46, in a one-to-one relationship. In contrast, zone 38 has non-conservative automatic transformations associated with it. In this case, the vertices are grouped into pairs, and each vertex pair has an associated pointer 48 to an automatic transformation 50.

Referring again to FIG. 17, different states are generated for the model, as depicted by the state generator 52. The generation of the states can be carried out in response to a variety of different types of input data. For example, the states might be explicitly defined by the user. Alternatively, they can be prestored in a file 54 which pertains to a particular animation sequence, and retrieved therefrom. As described previously, each state can be defined as a vector within a particular zone of the state space. This vector is provided to a configuration interpolator 56, which obtains the configuration data for each of the example images in the zone of interest, and performs a multi-target interpolation to determine the configuration of the control points, or the like, for the designated state.

The state data is also provided to an automatic transformation accumulator 58. The accumulator 58 retrieves automatic transformation data from the stored model 30 and computes an automatic transformation value for the new state being generated. In the case of conservative transformations, this value comprises the difference between the transformation value for the previous state and the transformation value for the new state, as described previously. In the case of non-conservative transformations, this value is computed using the matrix procedure described previously. The automatic transformation value for the new state is then added to the current transformation value that was stored in the accumulator in connection with the previous state.

The interpolated configuration data are provided to a renderer 60, which computes a rendered image, e.g. a bit-mapped image, in accordance with the stored image parameters 34. This rendered image is transformed in accordance with the accumulated transformation value provided from the accumulator 58. The resulting image is then displayed on the display device 128.

Tugging

Depending upon the user's level of skill, working within the state space of an animation may not be convenient. For example, specifying the proportional components $\lambda_i$ of each example for each designated state may not be an intuitive operation. Therefore, in accordance with the present invention, a second, more interactive approach to animation is provided. In this approach, which is known as tugging, the user directly manipulates configuration parameters of the graphic image, rather than working within the state space. These configuration parameters relate to aspects of the image which are directly observable by the user. They might comprise, for example, the (x,y) location of a control point in a two-dimensional image, or a parameter such as a color.

In a tugging operation, the user selects some configuration parameters of the image, and employs an input device 62, such as the cursor control 126, to define a change in those configuration parameters. For example, the user could select the hand of a figure and move it to specify a pose or motion path.

The configuration parameters change in response to movements of the input device. In the case of the hand, for example, the configuration parameters may be the (x,y) coordinates of a control point for the image. Clicking anywhere on the area of the hand causes the control point to be selected, i.e. each control point has a certain amount of "real estate" associated with it. Moving any part of that real estate causes the value of the configuration parameter associated with the control point, in this case its x, y location, to be changed. The tugging operation is essentially the inverse of the driving operation. More particularly, as the user moves the input device, a tugger component 64 of the graphic system determines a state that causes the control point to move within the model to a position corresponding to the position value specified by the input device. This state is then provided to the state generator 52, and used to display the appropriate graphic images, so that the displayed image appears to move in response to the movement of the input device.

The tugging operation is not limited to the movement of objects within an image. For example, color is another configuration parameter that can be manipulated via tugging. A zone might be composed of example images which depict the same scene but in different respective colors. In this case, when the user clicks on a particular area of the scene, a color tool can be displayed adjacent to the image. This color tool can include one or more slider bars which enable the user to directly manipulate color components along different axes of the applicable color space, such as red, green and blue components. As the user moves the slider bars, the graphic system determines image states which correspond most closely to the selected color, and displays the resulting image to provide interactive feedback to the user.

Figures 19A, 19B:
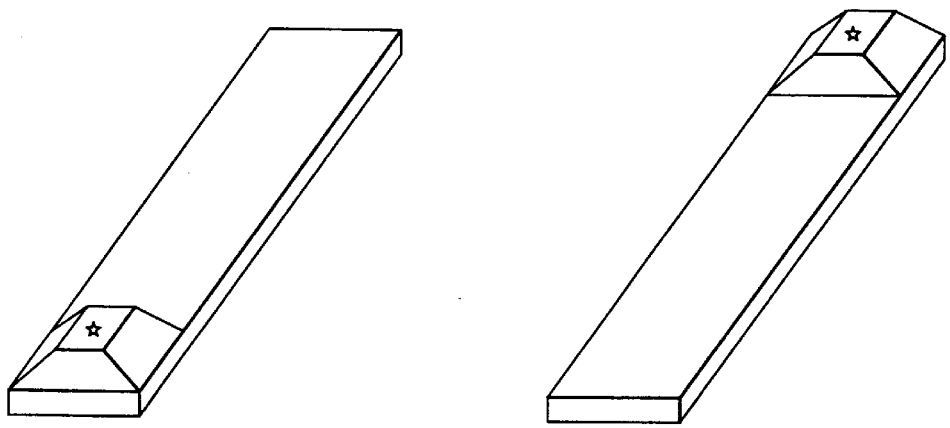
FIGS. 19A and 19B are two illustrations of a slider bar with a user-controllable handle.

To facilitate the direct manipulation of the model, each image can be provided with at least one graphical primitive that is referred to herein as a handle. The handle has an (x,y) location that is considered to be a configuration variable of the image and therefore can be manipulated as previously described. Depending upon the desires of the designer and the skill level of the user, the handle may or may not be visible within the image. If the handle is visible, the user can directly select and manipulate it. If it is not visible, then clicking on a predetermined portion of the image, such as a particular object or area of color, can select the handle. For example, FIGS. 19A and 19B illustrate a slider bar that might appear in an image. The star on top of the slider indicates the location of the actual handle, which might be invisible to the user. The state of the image can be manipulated by dragging any part of the slider, which is grouped with the handle. As in the previous examples, when the user moves the handle, the graphic system determines the state which corresponds to the desired handle position and displays the image corresponding thereto.

In addition to interactive tugging, in which the image moves in response to a manually operated input device, an automated form of tugging, known as batch tugging, can be implemented. In this embodiment, a subset of handles are given motion data to mimic. The motion data can be derived from a variety of sources, such as features on another animation, tracked features on an actor, or handles on another graphic.

If the user desires to control many configuration parameters, such as the locations of multiple handles, a virtual mouse can be employed to control the positions of some subset of the configuration parameters. For example, if the user clicks a cursor on a particular handle, a virtual mouse can be used to hold some or all of the other handles in place, so that only the one selected by the user is moved. Alternatively, the virtual mouse can be employed to cause the other, unselected handles to move in a coordinated manner with the one selected by the user. In operation, therefore, the real and virtual mice act together as a multi-dimensional mouse. The handle associated with the real mouse tries to follow its movement, while the handles associated with the virtual mice stay in their original locations or undergo predefined, coordinated movements.

Tugging operations can be one of two types, namely those which are intra-simplicial, i.e. all of the resulting states are contained within a single zone, or inter-simplicial, in which the states cross from one zone to another. The simplest situation is a tugging operation in which the state of the image changes without crossing the boundary of a zone. This type of tugging can be accomplished by means of a pseudo-inverse matrix. As an illustrative example, a driving operation which takes place in the absence of automatic transformation will first be considered. In this driving operation, a configuration is computed by interpolating linearly between examples. Since the relationship between the interpolation weights and the handle locations is linear, it can be expressed by the matrix equation $\Delta X = J \Delta \lambda$, where $\Delta \lambda$ is a change to the vector of interpolation weights, $\Delta X$ is the resulting change in the vector containing the handle positions, and J is a Jacobian matrix which expresses the relationship between the two vectors.

The pseudo-inverse technique computes a matrix $J^{-1}$ such that, for a given desired change $\Delta X$ in the handle locations, a change to the interpolation weights is made that will approximately produce such a change, i.e. $\Delta \lambda = J^{-1} \Delta X$. The computation of the pseudo-inverse matrix $J^{-1}$ can be carried out in any of a number of well known manners.

Using a similar approach, the matrices J and $J^{-1}$ can also be computed when automatic transformations are employed. With this technique, when the user drags one or more configuration parameters in the image, the system can readily compute how the state of the image must change to bring about the requested change in configuration.

The Jacobian matrix quantifies the differential properties of a surface which describes the relationship between the states and the configuration parameters. If the automatic transformations include operations other than translation, then this surface will be non-linear. This presents a computational difficulty that is addressed by the present invention. In one implementation of tugging that does not avoid this difficulty, a small increment of movement along a tangent to the surface is taken for each unit of movement of the input device. For each such increment of movement, a new Jacobian matrix is computed. While this approach causes the state to closely track the handle movement, it can be appreciated that it is computationally expensive. Furthermore, since the transformed configuration space is non-linear, the surface can contain cusps or other anomalies, and errors can accumulate.

In a preferred embodiment of the invention, therefore, a linearized configuration map is employed. In the following description of the computation and use of a linearized configuration map, X(a), X(b) and X(c) refer to three image examples in a two-dimensional zone, and T(a), T(b) and T(c) refer to the transformations for the zone. For a given state, the image to be displayed is determined by linearly interpolating among X(a), X(b) and X(c) to obtain an interpolated configuration X(s), and linearly interpolating among T(a), T(b) and T(c) to obtain an interpolated transformation T(s). The final image is obtained by applying T(s) to X(s), denoted herein as T(s)×X(s).

The linearized configuration map is computed by interpolating among the transformed configuration data for the zone. More particularly, at each vertex of the zone, the transformed configuration values are computed, i.e. T(a)×X(a), T(b)×X(b) and T(c)×X(c). For any given state, the linearized configuration is determined by linearly interpolating among these transformed configurations, to create a map. Thereafter, whenever the user directly positions a configuration variable, the corresponding state is obtained from the map. A particular advantage of this approach is the fact that the configuration map defines a flat surface, thereby giving the designer a good degree of control over the "feel" of the handle during tugging. Furthermore, the linearized configuration map only needs to be computed once as the state enters a zone, rather than for each incremental change in the configuration parameter.

If the new state required to accomplish the requested change in configuration parameter lies outside the current zone, additional considerations come into play, to present a behavior that appears natural to the user. These considerations will be explained with reference to the state space illustrated in FIG. 3. In this case, it is assumed that the current state is the point 12 illustrated in the figure, and tugging by the user causes the state to move along a line away from that point. When a boundary of the zone is encountered, subsequent actions will depend on whether there is at least one zone on the other side of the boundary.

One possibility is that there is no zone on the other side of the boundary. For example, the state of the image may encounter the boundary BC of the zone. Since the state is at a boundary, this means that at least one of the interpolation weights has gone to zero, in this case the weight of example A. The process continues from this point as if the zone contained only examples B and C. All further movements lie along the line BC. Consequently, whenever a boundary is encountered which is not shared by another zone, the operation continues in the current zone, but with one vertex removed. If the procedure reaches a point at which the zone is reduced to only one vertex, the tugging operation stops. This would happen, for example, if the state were to travel along the BC line until it reaches the vertex C.

Another possibility is that a zone is present on the other side of the boundary. Thus, for example, if the process had proceeded along the line BC up to the vertex B, the state can continue into the zone ABD, taking all of its vertices into account.

A third possibility is that two or more zones lie on the other side of the encountered boundary. In such a case, one of the zones is chosen as the destination, and the process proceeds as in the previous situation. The particular zone that is chosen can be selected in any arbitrary fashion. For example, it can be the one that was first created by the system designer. In a more sophisticated approach, a quantitative measure can be employed to select the zone. One example is to choose the zone in which the state moves the least to accomplish a given $\Delta X$. Another approach is to choose the zone in which the handles which are not being dragged by the user would move the least amount. In another embodiment, several criteria can be balanced against one another, for example through a rapid matrix computation. Other possible approaches to choosing a particular zone will be readily apparent.

Pasting

Figure 20:
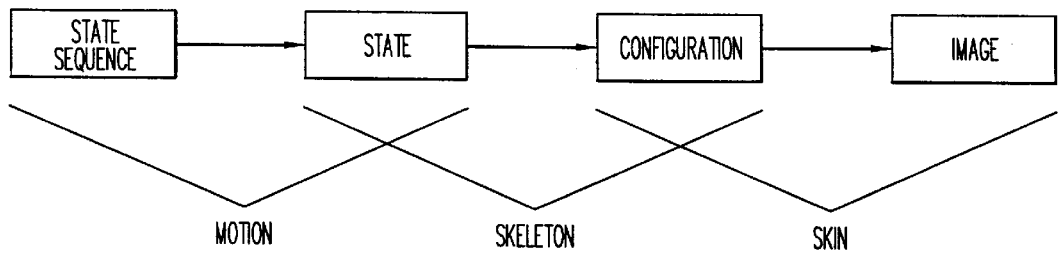
FIG. 20 is a flow diagram of the procedure of the present invention, showing the manner in which different components can be grouped to form modular portions.

The basic components in the generation of an image in accordance with the present invention are illustrated in the flow diagram of FIG. 20. Referring thereto, a manipulation such as an animation begins with the definition of a state sequence. The states are applied, in succession, to the model. For each given state, the graphic system computes a configuration consisting of the locations of the control points of the primitives. In addition, other parameters, such as colors, transparency values, and the like, can also be computed as part of the configuration. Once the configuration has been determined, it is rendered to generate a visible image.

These components of an animation can be used to define three distinct mappings between elements. One mapping is composed of a state sequence and a description of the state space in which it resides. This mapping is labeled as a clip motion, and basically specifies an animation in state space. A second portion of the animation, labeled the graphic skeleton, or clip character, specifies a mapping from state space to configuration space, i.e. a mapping from state space to control points and a mapping from state space to transformation space. The final portion, labeled the graphic skin, specifies how the configurations and transformations determine rendered images, by attaching geometric primitives, color, and the like to the control points.

An advantage associated with factoring an animation into these three distinct components resides in the fact that each of these components can be mixed and matched with one another, under certain conditions of compatibility. Thus, one person could define a particular type of clip motion, such as a ballerina's plié and a different person could determine a graphic skeleton, such as a set of example images of a cowboy. The graphic motion can be pasted onto the separately authored skeleton, to result in an image of a cowboy performing the plié. In a similar manner, a graphic skin can be pasted onto a graphic skeleton to provide the cowboy with different appearances.

Since the mapping defined by a clip character includes transformation values, assurance is provided that the resulting image will always be correct. For example, if an animation sequence includes an image of a giant doing a grand jeté, the giant's jump may cover a considerable distance. If the character of the giant is replaced by one for a gnome, the jump should not cover as much distance. This difference is accounted for in the automatic transformations for the characters. More particularly, the automatic transformation for the giant may include a translation value of 20 units, whereas that for the gnome would only have a translation value of 5 units. In this case, therefore, the gnome's jump does not cover as much ground.

To paste a clip motion onto a clip character, the only requirement is that the respective state spaces for the motion and the skeleton be isomorphic. Generally speaking, two state spaces are considered to be isomorphic as simplicial complexes if each vertex in the first state space can be mapped to a corresponding unique vertex in the second state space, in such a way that the zones form the same topological structure. If this condition exists, the graphic motion for one model can be pasted onto the separately generated graphic skeleton for a different model. In essence, pasting is the application of the isomorphism to the clip motion. If there is only one mapping between the respective state spaces for the two models, the procedure for pasting the motion to the skeleton can be unambiguously defined. If, however, there are multiple possible mappings, the user can select any one within which to implement the pasting operation.

Figure 21A:
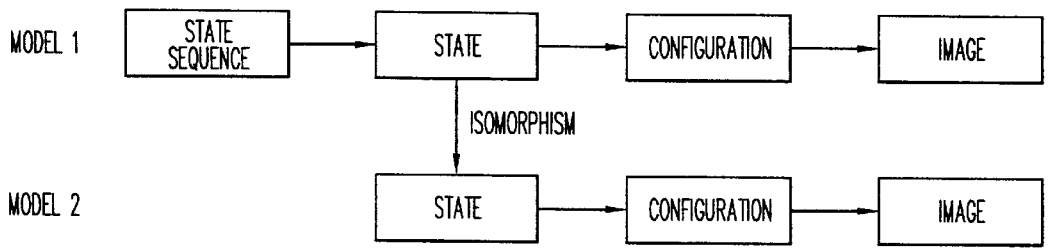
FIGS. 21A and 21B are schematic representations of the pasting of a clip motion and a clip character, respectively.

The pasting of a clip motion is schematically illustrated in FIG. 21A. The generation of an animation in Model 1 is implemented through the four basic steps of generating a state sequence, computing each state, determining the corresponding configuration, and applying texture to the configuration to render the image for the state. A second model, Model 2, has a state space which is isomorphic to the state space of Model 1. Thus, the pasting operation basically involves the process of applying the original state sequence to the states in Model 2. Thereafter, the process continues in the normal manner, so that the original animation is presented with the images of Model 2.

Figure 21B:
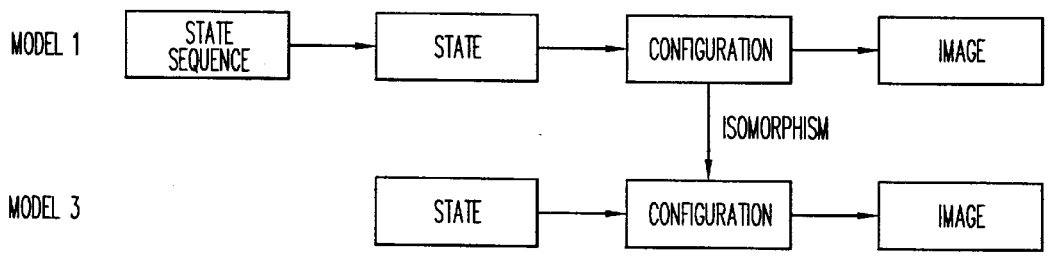

In a similar manner, a graphic skin can be pasted onto a given graphic skeleton. Again, the only constraint is that the configuration spaces for the skeleton and the skin be isomorphic. Isomorphism in the context of a configuration space means that each configuration parameter in one space can be mapped to a corresponding configuration parameter in the other space. Referring to FIG. 21B, the pasting operation essentially involves attaching to each parameter in the configuration space for the original model the interpretation (location, color, etc.) that is assigned to the corresponding parameter in the configuration space for the new model, in this case Model 3.

As discussed above, it is preferable that the state spaces and/or configuration spaces of models be isomorphic when pasting of clip motions or clip characters is carried out. In some cases, it may be desirable to perform pasting between different models even if their spaces are not isomorphic. In the context of the invention, this can be accomplished by the use of a technique referred to herein as a state space adapter. The state space adapter essentially comprises a simplicial map, namely a mapping of vertices in a source state space to vertices in a destination state space. The only constraint on such a mapping is that a set of vertices which are in the same zone in the source state space must be together in a zone in the destination state space.

Referring to FIG. 22A, a source state space is composed of a two-dimensional zone ABC and three one-dimensional zones CD, DE and CE. A clip motion in this state space is indicated by a series of points m. A second state space might be composed of a plurality of two-dimensional and one-dimensional zones, as shown in FIG. 22B. The simplicial map which forms the state space adapter establishes a mapping f between the two state spaces, such that a vertex in the first state space, $v_1$, is mapped to a vertex $v_2$ in the second state space, i.e. $v_2=f(v_1)$. As can be seen in FIG. 22B, it is possible to map each of the vertices in the state space of FIG. 22A to a corresponding vertex in the state space of FIG. 22B. In this case, the state space of FIG. 22B contains additional vertices which do not correspond to any of the vertices of the source state space. However, for purposes of pasting a clip motion from the source state space to the destination state space, these additional vertices are irrelevant. As long as f is a simplicial map, pasting can be supported, even when f is not subjective. For example, if a state space contains five zones, but the clip motion only involves states in two of the zones, it is only necessary that there be a mapping from these two zones in the source state space. If the other three zones are absent from the domain of f, pasting can still be carried out.

In the example of FIG. 22B, every vertex in the source state space maps to a unique vertex in the destination state space. However, this need not be the case. Two or more vertices in the source state space can map to the same vertex in the destination state space, i.e. the state space can be collapsed, as long as the above-noted constraint is met. For example, FIG. 22C illustrates another destination state space to which the source state space of FIG. 22A is mapped. In this case, two vertices D and E in the source state space are mapped to the same vertex in the destination state space. These two vertices are in the same zone in both the source state space and the destination state space. Hence the mapping is permissible.

Consequently, for any type of action which normally requires isomorphism as a condition for proper behavior, non-isomorphic state spaces can be utilized if it is possible to establish a simplicial map between the spaces.

Multiple State Spaces

In all of the foregoing examples, the model which is used to generate images contains a single state space. In further embodiments of the invention, a model which contains multiple state spaces can be employed. For instance, two different ways to manipulate a model have been described, namely driving and tugging. In certain applications it is useful to be able to drive some aspects of the model while tugging others. For example, a model of a humanoid character might have certain vital functions such as breathing or blinking occur automatically, while poses of the humanoid can be manipulated interactively by the user. In this case, the vital functions are driven whereas the pose is tugged.

In accordance with another aspect of the invention, such a result can be accomplished by using a model with a cross-product state space. Such a model contains two state spaces, with each state space defined as a set of zones, and each zone being a set of vertices. Every vertex is in either one state space or the other. The two state spaces need not be isomorphic to one another.

A bivertex is defined to be a pair of vertices, composed of one vertex from one state space and another vertex from the other state space. In a model with a cross-product state space, each example is associated with a bivertex. An image can be specified as a bistate, which is a state within one state space together with a state in the other state space. More particularly, the image is formed by interpolating between the example images, with the relative proportion of each example image being determined by the product of the associated relative weight in the first state in the bistate, and the associated relative weight in the second state in the bistate. An animation sequence can be specified by a sequence of bistates.

An example will be explained with reference to the state space illustrated in FIG. 3, whose examples are depicted in FIGS. 2A–2D. The zones of the state space are ABC and ABD, and the examples associated with A, B, C and D correspond to different bodily poses of the character. To make a cross-product state space a second state space is defined, e.g. one that contains only a single one-dimensional zone, YZ. The bivertices in this case are AY, BY, CY, DY, AZ, BZ, CZ and DZ. The examples associated with these bivertices could be the same as those depicted in FIGS. 2A–2D, except those associated with the bivertices containing Y have open eyes, and those associated with the bivertices containing Z have closed eyes. In a simple embodiment of the invention, the artist draws every such example individually. In a more sophisticated embodiment of the invention, the system may construct some of the examples automatically. For example, the example associated with bivertex BZ could be constructed using the pose of the example associated with bivertex BY and the eyes of the example associated with bivertex AZ.

An example of a bistate could be 30% A, 60% B, 10% C (as shown in FIG. 3), 75% Y and 25% Z. The image corresponding to this bistate is then formed by interpolating between all eight image examples such that example AY has an interpolation weight of 30%×75%, example AZ has an interpolation weight of 30%×25%, etc. This double interpolation can be expressed as follows:

$$\Sigma_{ij}\lambda(v_i)\lambda'(v'_j)\overline{\chi}(v_i, v'_j)$$

where $\lambda(v_i)$ is the interpolation weight for an vertex in the state space ABCD, $\lambda'(v_j)$ is the interpolation weight for an vertex in the state space YZ, and $\overline{\chi}$ $(v_i, v_j)$ is an example associated with the bistate $v_i, v_j$. This interpolation can be expressed in matrix form as shown in FIG. 23.

To create a character with automatically blinking eyes and an interactively manipulable pose, the state is driven in the YZ space with a sequence of random states, and tugging is performed in the space containing the zones ABC and ABD. The combined operation of tugging and driving can be accomplished in a number of different ways. For example, consider a situation in which the automatic blinking mechanism has driven the state in the YZ space to 75% Y, 25% Z. From the foregoing, it can be seen that the examples AY and AZ will be present in the interpolated image in a 75/25 ratio, as will BY and BZ, etc. The tugging operation can then be viewed as operating on a four-example model with a state space isomorphic to the state space depicted in FIG. 3, whose examples are 75% AY and 25% AZ for vertex A, 75% BY and 25% BZ for vertex B, and so forth. Thus, tugging can take place in the same manner as described previously. If automatic transformations are present, they are attached to bivertices (in the case of conservative zones in the (ABC, ABD) space), or to bivertex edges (in the case of the non-conservative zones).

In another aspect of the invention, the model can be a composite model which comprises a number of individual models. This approach is useful where the image contains a number of components which do not all exhibit the same behavior. For instance the image might be one of a wagon which rolls along the ground. The wagon has two main components, the wheels and a body. As described previously with reference to the example of FIGS. 8A and 8B, the images of the wheels should rotate as they move along the ground. This can be accomplished by means of automatic transformations. However, the body of the wagon should not rotate with the wheels. Therefore, a separate model should be employed for the wagon, since different automatic transformations apply to its behavior. These different models for the individual components of the image should be isomorphic to one another. Together they form a composite model, in which the current state is the same for all of the individual models at any given instant.

When multiple models are employed in a concurrent fashion, it can be useful to establish a hierarchical attachment between them. For example, one model might depict a face, and another model might pertain to a separately controlled mouth for the face. Whenever the image of the face undergoes an automatic transformation, e.g. translation in the horizontal direction, the image of the mouth should undergo the same transformation. To accomplish such a result, hierarchical attachment can be employed.

Figure 24:
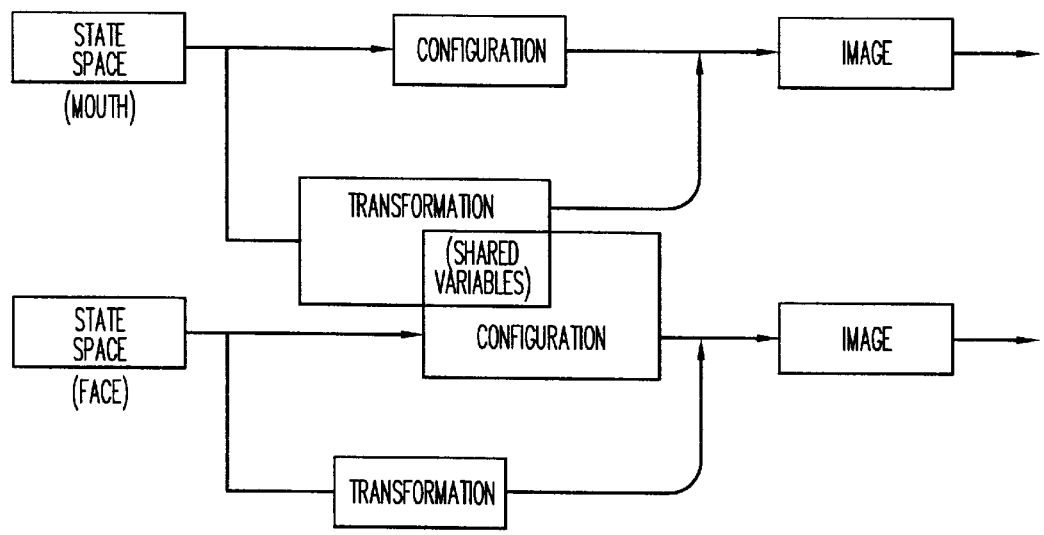
FIG. 24 is an illustration of hierarchical attachment between models.

When hierarchical attachment is employed, one or more of the transformation parameters for one model are treated as configuration parameters by the other model, instead of being governed by its own automatic transformations. Referring to FIG. 24, a first model comprises a state space with an associated configuration space and transformation space. This model might relate to the image of the face in the example given above. When a change in state occurs, the corresponding configuration and transformation are computed. The resulting transformation is applied to the configuration for the rendering of the image.

A second model also comprises a state space with corresponding configuration and transformation spaces. This model can relate to the image of the mouth in the above example. When a change in state occurs in this model, the corresponding configuration and transformation are computed. One or more of its transformation parameters are taken from the configuration of the first model. In other words, some of the configuration parameters are shared between the two models. In the example given above, these shared variables might pertain to the points at which the image of the mouth is attached to the image of the face. In effect, one or more transformation parameters of the second model depend on the state of the first model. This result is accomplished by establishing a hierarchical attachment between the two models.

In the composite model described previously, the same state is employed concurrently in each of the component models to form the resulting image. In another embodiment of the invention, multiple models are employed but the current state sequentially moves from one model to the next. This embodiment may be useful when it is desired to carry out automatic actions, especially when those automatic actions involve sequences of frames that cannot be generated by interpolation. For instance, an image of the sky can be made to appear as if stars are twinkling in a random fashion. To do so, a first model is created in which airplanes and clouds appear in various positions. In all of the examples of this model, a particular set of stars is drawn. In a second model, all of the examples of the first model are replicated, and a different set of stars is drawn. In a third model, the examples are again replicated, with yet a different set of stars.

During image generation, the user can select states to cause the image to move in any desired manner, through driving or tugging. While the image is being displayed, the graphics system automatically steps through each of the models in a sequential fashion. As a result, the stars appear to regularly twinkle without requiring any action on the part of the user. In other words, as the user moves the image of the airplane from state $s_1$ to state $s_2$ to state $s_3$, the system automatically moves from the first model to the second model and then to the third model, independently of the changes in the states. The sequential transition among the models can be carried out on a temporal basis, e.g. a different model each second, or any other random basis.

From the foregoing, it can be seen that the present invention provides an embedded-constraint graphics system that permits users without special artistic talent to create visually pleasing image manipulations, such as animations. The constraints are defined by the originally produced images themselves. Thus, a content producer merely needs to generate multiple variations of an image, and to specify which variations can be mixed by interpolation. There is no need to specify algebraic equations or explicit constraints. Once these elements are determined, the manipulations are obtained by specifying a small number of parameters, which define a state.

An advantage associated with the use of a topological data structure to define a model in accordance with the present invention is the fact that topological computations can be performed on the data to provide various types of information. For example, given the fact that the topological structure is a simplicial complex, it is possible to compute different types of invariants, such as homology groups, relative homology groups, adjacency, connectivity, boundary, co-boundary, incidence, genus, rational and integral homology. These invariants, and the computation thereof, are well-known in themselves and described, for example, in Donald and Chang, "On the Complexity of Computing the Homology type of a Triangulation," EEEE Symposium on the Foundations of Computer Science, San Juan, Oct. 1991, pp. 650–661. The information obtained from these invariants can be used in turn to determine how complex a particular structure might be, e.g. how many holes it may contain and hence how difficult it would be to navigate through it. Other characteristics that might be determined include whether the state space is likely to exhibit artifacts, and whether it is isomorphic to another state space. The information obtained from these invariants can also be used to construct state space adapters, or to check the admissibility of mappings between state spaces for purposes of pasting.

Figure 25:
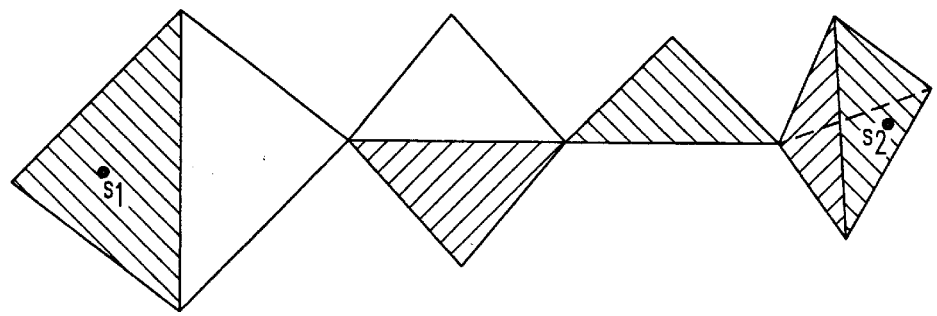
FIG. 25 is an illustration of a state space having numerous zones, for illustrating interpolation across distant zones.

Furthermore, the use of such a structure and the information pertaining thereto facilitates the ability to specify an animation by beginning and ending states which are situated in distant zones. For example, FIG. 25 shows a state space have numerous zones. A user might specify that an animation is to begin at a first state $s_1$ in one zone and end at another state $s_2$ in a distant zone, without specifying the particular path to be taken. Since all of the zones are connected, it is possible for the graphics system to automatically determine a path from $s_1$ to $s_2$. For example, using well-known techniques, it is possible to first determine a sequence of pairwise adjacent zones that connect the two states. For example, the system may choose to take the shortest path from $s_1$ to $s_2$. Once this sequence is determined, the appropriate paths within each of the zones can be computed using the method of computing via points previously described.

The invention has heretofore been described in connection with the depiction of graphical subjects such as animated characters, mechanisms, and the like. In some instances, the author may wish to use the model as a tool for visualizing the state space itself. Such a model, referred to herein as a state-space debugger, can be constructed in the following manner. With each vertex in the state space, the author associates a diagram of the state space, much like the ones depicted in FIG. 3, etc. The various example images all depict the same state space, but they may represent different views or arrangements of the zones. Finally, the author adds to the parameterized image a small graphical object (e.g., a dot), and places it on the corresponding drawn vertex in each example image. From the foregoing description, it can be seen that when such a model is driven, the drawn dot will represent the movement of the state within the state space. Moreover, the dot will be tuggable, so that the state-space debugger serves as a graphical interface to manipulation of the state.

It will be appreciated by those of ordinary skill in the art that the present invention can be embodied in other specific forms without departing from the spirit or essential characteristics thereof. For instance, while all of the operations pertaining to the generation and display of an image have been described in the context of being carried out on a single computer, the practical implementations of the invention are not limited to this one case. For example, it is possible to generate state information in one computer, e.g. a server on a network, which is then transmitted to a remote computer for display of an image. At the remote computer, if the user carries out a tugging operation, the position of the user's cursor on the screen can be transmitted back to the server, to cause a new state to be generated and displayed. Further in this regard, due to the modularity of system components, different images can be displayed at the server and each of the remote computers, as long as the constraints relating to isomorphism are followed. Thus, when a user performs a tugging operation on an image at one remote computer, a corresponding state change appears on various different images being displayed at the server and other remote computers.

The presently disclosed embodiments are therefore considered in all respects to be illustrative, and not restrictive. The scope of the invention is indicated by the appended claims, rather than the foregoing description, and all changes that come within the meaning and range of equivalents thereof are intended to be embraced therein.

What is claimed is:

1. A method for the manipulation of graphic images, comprising the steps of:
    generating a plurality of parameterized image examples;
    defining a model containing a state space which comprises a plurality of zones having vertices, with at least one of said zones having at least three vertices;
    associating said image examples with respective vertices in said state space;
    establishing a sequence of states within said state space, wherein each state comprises a set of interpolation weights respectively associated with the example images corresponding to a given one of said zones; and
    sequentially displaying images which correspond to each of said states.

2. The method of claim 1 wherein said zones form a connected structure.

3. The method of claim 1 wherein each of said example images is a two-dimensional image.

4. The method of claim 1 wherein said model is a composite model comprising a plurality of component models, all of which define respective state spaces which are isomorphic to each other, and wherein said the step of sequentially displaying images includes applying each of said states to all of the component models of said composite model.

5. The method of claim 1 further including the step of defining a transformation for at least one of the vertices in a zone, which identifies a change in a frame of reference for an image when going from one state to another in said zone.

6. The method of claim 5 wherein at least one vertex is shared between two zones, and the shared vertex has a distinct transformation defined for each of the two zones with which it is associated.

7. The method of claim 6 wherein said distinct transformations are different from one another.

8. The method of claim 7, wherein at least two vertices are shared between first and second zones, and wherein the difference between the transformations associated with the two vertices in the first zone is required to be equal to the difference between the transformations associated with the vertices in the second zone.

9. The method of claim 5 further including the steps of:
    determining a transformation value for each state in said sequence by interpolating the transformations for the vertices in a zone in accordance with the interpolation weight values associated with the example images for each of the respective states,
    establishing a current transformation value for a first state,
    determining a difference transformation value for a transition from the first state to a second state,
    adding said difference value to the current transformation value, to compute a new current transformation value, and
    displaying the image associated with said second state in accordance with the new current transformation value.

10. The method of claim 9 wherein said transformation values are determined by linear interpolation.

11. The method of claim 9 wherein, if two successive states in said sequence lie in adjacent zones, the transition from a first state to a second state is carried out by the following steps:
    moving from a first state in one zone to a first via point in said one zone which is on a border of said one zone that is shared with an adjacent zone;
    moving from said first via point to a second via point which on said border is in said adjacent zone, wherein said first and second via points have the same weighted combination of images associated with them; and
    moving from said second via point to a second state in the adjacent zone.

12. The method of claim 9 wherein said sequence of states is established by selecting at least one configuration parameter that is associated with a component of the image, changing the value of the selected parameter, determining a state which corresponds to the new value of the parameter, and displaying the image associated with the determined state.

13. The method of claim 12 further including the steps of establishing a sequence of successive parameter values, determining a sequence of states which respectively correspond to said sequence of parameter values, and displaying the images which correspond to said states so that said images match the changes in the parameter values.

14. The method of claim 1 wherein said model comprises two state spaces and said image examples are associated with pairs of vertices respectively corresponding to said two state spaces, further including the steps of:
    establishing a state in each of said state spaces;
    computing an image by summing interpolation weights which are the cross product of the interpolation weights for the states in said two state spaces; and
    displaying an image which corresponds to said cross product.

15. The method of claim 14 wherein the state for one of said state spaces is established by directly manipulating a configuration parameter associated with said state space, and the state for the other state space is established by directly specifying a state.

16. The method of claim 1 further including the step of defining an edge transformation for at least one edge between a pair of vertices in a zone, which identifies a change in a frame of reference for an image when going from one state to another in said zone.

17. The method of claim 16 further including the steps of:
    computing a transformation vector field for a zone from the edge transformations associated with the zone,
    establishing a current transformation value for a first state,
    computing a path integral for a transition from the first state to a second state,
    adding said path integral to the current transformation value, to compute a new current transformation value, and
    displaying the image associated with said second state in accordance with the new current transformation value.

18. The method of claim 5 or 17 wherein a transformation comprises at least one of scaling an image, rotating the image, and translating the image relative to a frame of reference.

19. The method of claim 5 or 17 wherein at least two related models are defined such that at least one transformation parameter of one model is incorporated in the configuration space of the other model.

20. The method of claim 17 wherein the path integral is on a straight-line path.

21. The method of claim 17 wherein said vector field is defined such that the path integral on the edge of the zone matches the edge transformation for said edge.

22. The method of claim 21 wherein said vector field is linear.

23. The method of claim 22 wherein said path integral is computed by a matrix.

24. The method of claim 23 wherein said edge transformations are anti-symmetric.

25. The method of claim 17 wherein, if two successive states in said sequence lie in adjacent zones, the transition from a first state to a second state is carried out by the following steps:

moving from a first state in one zone to a first via point in said one zone which is on a border of said one zone that is shared with an adjacent zone;

moving from said first via point to a second via point which is on said border in said adjacent zone, wherein said first and second via points have the same weighted combination of images associated with them; and moving from said second via point to a second state in the adjacent zone.

26. The method of claim 1 further including the steps of defining a plurality of models having state spaces which are isomorphic to one another, generating said sequence of states in one of said models, and applying said sequence of states to the isomorphic state space of another one of said models to generate images.

27. The method of claim 26 wherein a plurality of clip motions each comprising a respective sequence of states are defined, and further including the step of applying any one of said clip motions to the state space of any one of said models.

28. The method of claim 1 further including the steps of defining a plurality of models having configuration spaces which are isomorphic to one another, generating a state in one of said models, and applying said state to the isomorphic configuration space of another one of said models to generate images.

29. The method of claim 28 wherein a plurality of clip characters each comprising a respective configuration are defined, and further including the step of applying any one of said clip characters to the configuration space of any one of said models.

30. The method of claim 1 wherein said example images are combined in accordance with a linear function to form said weighted combination.

31. The method of claim 1 wherein said parameterized image examples depict the state space of the model, with each example image illustrating the location of a corresponding vertex in the state space.

32. The method of claim 1, further including the step of identifying topological properties of said mode.

33. The method of claim 32 wherein said topological properties are selected from the group comprising adjacency, connectivity, homology type, boundary and co-boundary.

34. The method of claim 1 further including the steps of defining a plurality of models, defining a simplicial map from a state space in one model to a state space in another model, generating a sequence of states in said state space for said one model, and applying said sequence of states to said state space for said other model in accordance with said simplicial map.

35. A method for the manipulation of graphic images, comprising the steps of:

generating a plurality of parametric image examples;

defining a model containing a state space which comprises a zone having vertices;

associating said image examples with respective vertices in said state space;

defining a first state which comprises a set of interpolation weights respectively associated with the example images corresponding to a given one of said zones;

displaying an image which corresponds to said first state;

directly manipulating at least one configuration parameter associated with the image;

determining a second state which corresponds as closely as possible to the manipulated parameter; and displaying an image which corresponds to the second state.

36. The method of claim 35 wherein said state space comprises a plurality of zones.

37. The method of claim 36 wherein at least one of said zones has at least three vertices.

38. The method of claim 35 wherein the step of determining a second state comprises the steps of:

determining a Jacobian matrix which identifies the relationship between changes in said states and changes in the configuration parameter of said observable component;

computing a pseudo-inverse of the Jacobian matrix;

applying the pseudo-inverse of the Jacobian matrix to the change in said parameter which is defined by said manipulation to determine a change in state; and adding said change in state to said first state.

39. The method of claim 38 wherein said Jacobian matrix is computed such that any state within a zone comprises a linear interpolation of configuration parameters for the vertices of the zone as modified by transformation values associated with the respective vertices.

40. The method of claim 35, wherein said model further comprises transformation values which are associated with said zones, and said method includes the further steps of:

determining a current transformation value for said first state;

computing a difference transformation value for a transition from the first state to the second state from the value of said first state, the value of said second state, and said transformation values associated with said zones;

adding said difference value to the current transformation value, to compute a new current transformation value; and displaying the image associated with said second state in accordance with the new current transformation value.

41. The method of claim 40 wherein a transformation value is associated with each vertex in a zone.

42. The method of claim 41 wherein at least one vertex is shared between two zones, and the shared vertex has a distinct transformation value defined for each of the two zones with which it is associated.

43. The method of claim 42 wherein said distinct transformation values are different from one another.

44. The method of claim 43, wherein at least two vertices are shared between first and second zones, and wherein the difference between the transformation values associated with the two vertices in the first zone is required to be equal to the difference between the transformation values associated with the vertices in the second zone.

45. The method of claim 40 wherein an edge transformation value is associated with each pair of vertices in a zone.

46. The method of claim 45 wherein at least one vertex pair is shared between two zones, and the shared vertex pair has a distinct edge transformation value defined for each of the two zones with which it is associated.

47. The method of claim 46 wherein said distinct edge transformation values are different from one another.

48. The method of claim 47, wherein at least two vertex pairs are shared between first and second zones, and wherein the difference between the edge transformation values associated with the two vertex pairs in the first zone is required to be equal to the difference between the edge transformation values associated with the vertex pairs in the second zone.

49. The method of claim 40 wherein said transformation values are determined by linear interpolation.

50. The method of claim 40 wherein, if said first and second states lie in adjacent zones, the transition from the first state to the second state is carried out by the following steps:
    moving from a first state in one zone to a first via point in said one zone which is on a border of said one zone that is shared with an adjacent zone;
    moving from said first via point to a second via point which is in said adjacent zone on said border, wherein said first and second via points have the same set of interpolation weights associated with them; and
    moving from said second via point to a second state in the adjacent zone.

51. A method for the manipulation of graphic images, comprising the steps of:
    generating a plurality of parameterized image examples;
    defining a model containing a state space which comprises a plurality of zones having vertices, with at least one of said zones having at least three vertices;
    associating said image examples with respective vertices in said state space;
    establishing a sequence of states within said model, wherein each state comprises a set of interpolation weights respectively associated with the image examples corresponding to a given one of said zones;
    determining a transformation value for each state in said sequence;
    sequentially displaying images which correspond to each of said states; and
    shifting a frame of reference for each displayed image in accordance with its transformation value.

52. The method of claim 51 wherein said shifting comprises the steps of:
    establishing a current transformation value for a first state,
    determining a difference between the transformation values for the first state and a second state,
    adding said difference to the current transformation value, to compute a new current transformation value, and
    displaying the image associated with said second state in accordance with the new current transformation value.

53. The method of claim 51 wherein a transformation value is associated with each vertex in a zone.

54. The method of claim 53 further including the steps of:
    determining a transformation value for each state in said sequence by interpolating the transformation for the vertices in a zone in accordance with the interpolation weight values associated with the example images for each of the respective states,
    establishing a current transformation value for a first state,
    computing a difference transformation value from said transformation values, the value of said first state, and the value of said second state;
    adding said difference value to the current transformation value, to compute a new current transformation value, and
    displaying the image associated with said second state in accordance with the new current transformation value.

55. The method of claim 54 wherein said sequence of states is established by selecting at least one configuration parameter that is associated with a component of the image, changing the value of the selected parameter, determining a state which corresponds to the new value of the parameter, and displaying the image associated with the determined state.

56. The method of claim 55 further including the steps of establishing a sequence of successive parameter values, determining a sequence of states which respectively correspond to said sequence of parameter values, and displaying the images which correspond to said states so that said images match the changes in the parameter values.

57. The method of claim 54 wherein said transformation values are determined by linear interpolation.

58. The method of claim 54 wherein, if two successive states in said sequence lie in adjacent zones, the transition from a first state to a second state is carried out by the following steps:
    moving from a first state in one zone to a first via point in said one zone which is on a border of said one zone that is shared with an adjacent zone;
    moving from said first via point to a second via point which is in said adjacent zone on said border, wherein said first and second via points have the same weighted combination of images associated with them; and
    moving from said second via point to a second state in the adjacent zone.

59. The method of claim 51 wherein an edge transformation value is associated with each pair of vertices in a zone.

60. The method of claim 59 further including the steps of;
    determining a transformation vector field for a zone from the edge transformations associated with the zone;
    establishing a current transformation value for a first state,
    computing a path integral for a transition from the first state to a second state,
    adding said path integral to the current transformation value, to compute a new current transformation value, and
    displaying the image associated with said second state in accordance with the new current transformation value.

61. The method of claim 60 wherein the path integral is on a straight-line path.

62. The method of claim 60 wherein said vector field is defined such that the path integral on the edge of the zone matches the transformation for said edge.

63. The method of claim 62 wherein said vector field is linear.

64. The method of claim 63 wherein said path integral is computed by a matrix.

65. The method of claim 64 wherein said edge transformations are anti-symmetric.

66. The method of claim 64 wherein, if two successive states in said sequence lie in adjacent zones, the transition from a first state to a second state is carried out by the following steps:
    moving from a first state in one zone to a first via point in said one zone which is on a border of said one zone that is shared with an adjacent zone;
    moving from said first via point to a second via point which is in said adjacent zone on said border, wherein said first and second via points have the same weighted combination of images associated with them; and moving from said second via point to a second state in the adjacent zone.

67. A system for manipulating graphic images, comprising:

a data structure containing information pertaining to a set of parameterized image examples, and information which defines subsets of said set of images which can be interpolated with one another, wherein each individual subset contains less than all of the images in said set and all of the subsets together contain all of the images in said set;

means for designating a desired state for an image to be displayed; and means for generating an interpolated image that corresponds to said desired state, said interpolated image being composed of a weighted combination of the images in one of said subsets of images which can be interpolated with one another.

68. The system of claim 67 wherein said data structure further includes information identifying automatic transformations associated with said subsets of images which can be interpolated with one another, and said generating means applies said automatic transformations during the generation of interpolated images.

69. The system of claim 68 wherein said automatic transformations are respectively associated with individual images in a set of images which can be interpolated.

70. The system of claim 68 wherein said automatic transformations are respectively associated with pairs of images in a set of images which can be interpolated.

71. The system of claim 68 wherein said automatic transformations contain at least one of a scaling factor, a rotation factor and a translation factor which is applied to an interpolated image.

72. The system of claim 68 wherein said means for designating a desired state includes means for directing manipulating a configuration parameter for a generated image, and means for determining a state which corresponds to the configuration parameter of the component as manipulated.

73. The system of claim 72 wherein said configuration parameter is the location of a feature of the image.

74. The system of claim 72 wherein said configuration parameter is a color in the image.

75. The system of claim 72 wherein the means for determining said state comprises a Jacobian matrix which identifies the relationship between changes in said states and changes in said configuration parameter.

76. The method of claim 75 wherein said Jacobian matrix is computed such that any state within a zone comprises a linear interpolation of configuration parameters for the vertices of the zone as modified by transformation values associated with the respective vertices.

77. The system of claim 67 wherein said means for designating a desired state includes means for directing manipulating a configuration parameter of a generated image, and means for determining a state which corresponds to the configuration parameter of the component as manipulated.

78. The system of claim 77 wherein said configuration parameter is the location of a feature of the image.

79. The system of claim 77 wherein said configuration parameter is a color in the image.

80. A method for manipulating graphic images, comprising the steps of:

defining a data structure containing information pertaining to a plurality of parameterized image examples, and information which defines subsets of said set of images which can be interpolated with one another, wherein each individual subset contains less than all of the images in said set and all of the subsets together contain all of the images in said set;

displaying an image that is composed of a weighted combination of the images in one of said subsets of images which can be interpolated with one another;

directly manipulating a configuration parameter of the displayed image;

determining a state in one of said subsets of images that corresponds to the configuration parameter of the component as manipulated; and displaying an image that corresponds to the determined state.

81. The method of claim 80 wherein said configuration parameter is the location of a feature of the image.

82. The method of claim 80 wherein said configuration parameter is a color in the image.

83. A data structure stored in a memory that is accessible to a computer processor, said data structure defining a model for the generation and manipulation of graphic images, comprising:

a first set of information which identifies a plurality of parameterized images; and a second set of information which identifies groupings of said images into zones containing images which are permitted to be interpolated with one another, in which at least one zone contains at least three images and all other zones contain at least two images, and wherein each zone contains at least one image which is also contained in at least one other zone.

84. The data structure of claim 83 further including a third set of information which identifies automatic transformations that are associated with said zones.

85. The data structure of claim 84 wherein said automatic transformations are respectively associated with individual images in said zones.

86. The data structure of claim 84 wherein said automatic transformations are respectively associated with pairs of images in said zones.

87. The data structure of claim 84 wherein each automatic transformation includes at least one of a scaling factor, a rotation factor and a translation factor that is applied to an image when it is displayed.

88. A method for the manipulation of graphic images, comprising the steps of:

generating a parameterized image;

defining a model that contains a state space, said state space being composed of a plurality of zones having vertices which respectively correspond to plural examples of said image in which at least one configuration parameter differs from example to example;

defining a sequence of said models that are isomorphic to one another, in which another configuration parameter of the image differs from model to model;

establishing a state which comprises a set of interpolation weights respectively associated with the example images corresponding to a given one of said zones; and sequentially displaying images which correspond to said state from respective ones of said models.

89. A method for the remote manipulation of graphic images, comprising the steps of:

generating a plurality of parameterized image examples;

storing a model containing a state space at a first computer, said state space being composed of a plurality of zones having vertices, respectively corresponding to said image examples, with at least one of said zones having at least three vertices;

establishing a sequence of states within said state space at said first computer, wherein each state comprises a set of interpolation weights respectively associated with the example images corresponding to a given one of said zones;

transmitting said sequence of states to a second computer that is remote from said first computer; and sequentially displaying images which correspond to each of said states in a model which is stored at said second computer.

90. The method of claim 89 wherein the example images associated with the model stored at said second computer are the same as those associated with the model stored at the first computer.

91. The method of claim 89 wherein the example images associated with the model stored at said second computer are different from the example images associated with the model stored at the first computer.

* * * * *